(12) United States Patent
Xue et al.

(10) Patent No.: US 12,541,129 B2
(45) Date of Patent: Feb. 3, 2026

(54) BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Peng Xue, Beijing (CN); Zhuang Xu, Beijing (CN); Zhen Wang, Beijing (CN); Haijun Shi, Beijing (CN); Tianyang Han, Beijing (CN); Beibei Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/729,851

(22) PCT Filed: Aug. 23, 2023

(86) PCT No.: PCT/CN2023/114365
§ 371 (c)(1),
(2) Date: Jul. 17, 2024

(87) PCT Pub. No.: WO2025/039206
PCT Pub. Date: Feb. 27, 2025

(65) Prior Publication Data
US 2025/0110371 A1    Apr. 3, 2025

(51) Int. Cl.
*G02F 1/13357*    (2006.01)

(52) U.S. Cl.
CPC ................. *G02F 1/133608* (2013.01)

(58) Field of Classification Search
CPC ........... G02F 2201/00; G02F 1/133317; G02F 1/13332; G02F 1/133328; G02B 6/00
See application file for complete search history.

(56) References Cited

U.S. PATENT DOCUMENTS

| | | | | |
|---|---|---|---|---|
| 2013/0321739 A1* | 12/2013 | Cheng | ............ | G09F 13/04 |
| | | | | 362/433 |
| 2020/0081296 A1* | 3/2020 | Ma | ............ | G02F 1/133615 |
| 2020/0209687 A1* | 7/2020 | Yan | ............ | G02F 1/133308 |
| 2021/0191184 A1* | 6/2021 | Zhang | ............ | G02F 1/133608 |

FOREIGN PATENT DOCUMENTS

| | | |
|---|---|---|
| CN | 101630089 A | 1/2010 |
| CN | 201885104 U | 6/2011 |
| CN | 203757517 U | 8/2014 |
| CN | 104503125 A | 4/2015 |

(Continued)

*Primary Examiner* — Tracie Y Green

(57) ABSTRACT

A backlight module and a display device are provided. In the backlight module, the middle frame includes a connecting portion covering the side wall and located at an end of the side wall away from the bottom wall, a surface of the connecting portion facing the optical sheet is provided with a plurality of supporting portions configured to support the optical sheet, and the plurality of supporting portions are arranged at intervals, a gap is provided between the optical sheet and a surface of a part of the middle frame facing the optical sheet and located between adjacent supporting portions.

20 Claims, 10 Drawing Sheets

(56) References Cited

FOREIGN PATENT DOCUMENTS

| | | | |
|---|---|---|---|
| CN | 105911751 | A | 8/2016 |
| CN | 207992649 | U | 10/2018 |
| CN | 109507822 | A | 3/2019 |
| CN | 210865431 | U | 6/2020 |
| CN | 114326207 | A | 4/2022 |
| CN | 114859600 | A | 8/2022 |
| CN | 115167033 | A | 10/2022 |
| WO | 2022/205870 | A1 | 10/2022 |
| WO | 2023/070561 | A1 | 5/2023 |

\* cited by examiner

BACKLIGHT MODULE AND DISPLAY DEVICE

TECHNICAL FIELD

At least one embodiment of the present disclosure relates to a backlight module and a display device.

BACKGROUND

Usually, a large-size liquid crystal display (LCD) panel is spliced by a number of small-size glass substrates, which can reduce the risk of the LCD panel being easily broken because of its large size, and ensure the orderly progress of the manufacturing process. For example, a size of the large-size liquid crystal display panel can be more than 100 inches, and a size of the small-size glass substrate can be 220 cm×250 cm. In general, an edge portion of the optical sheet of the backlight module can lap a support frame and can be located on the support frame, and the glass substrates are located on one side of the backlight module and are configured to perform display. However, because the part of the backlight module used for lapping is usually difficult to meet the needs of light transmission, so that the edge region of the glass substrate is prone to form "dark region", the display effect needs to be improved.

SUMMARY

At least one embodiment of the present disclosure provides a backlight module and a display device.

At least one embodiment of the present disclosure provides a backlight module, the backlight module includes: a backplane, a middle frame, and an optical sheet, the backplane includes a bottom wall and a side wall, the side wall is connected with the bottom wall and arranged at a periphery of the bottom wall, and the bottom wall and the side wall form a receiving cavity; the middle frame is arranged around a circumference of the side wall, the side wall is configured to support the middle frame; the optical sheet is located at a side of the middle frame away from the bottom wall and arranged opposite to the bottom wall, the middle frame includes a connecting portion covering the side wall and located outside the side wall, and the connecting portion is located at an end of the side wall away from the bottom wall, a surface of the connecting portion facing the optical sheet is provided with a plurality of supporting portions configured to support the optical sheet, and the plurality of supporting portions are arranged at intervals, a gap is provided between the optical sheet and a surface of a part of the middle frame facing the optical sheet and located between adjacent supporting portions of the plurality of supporting portions.

For example, according to the backlight module provided by at least one embodiment of the present disclosure, the plurality of supporting portions are arranged at intervals along an edge of the middle frame, a minimum distance between two adjacent supporting portions is greater than a size of each of the plurality of supporting portions in an arrangement direction of the plurality of supporting portions.

For example, according to the backlight module provided by at least one embodiment of the present disclosure, in the arrangement direction of the plurality of the supporting portions, the minimum distance between the two adjacent supporting portions is 40 to 60 times the size of the supporting portion.

For example, according to the backlight module provided by at least one embodiment of the present disclosure, in the arrangement direction of the plurality of the supporting portions, the minimum distance between the two adjacent supporting portions is 45 mm to 50 mm.

For example, according to the backlight module provided by at least one embodiment of the present disclosure, in the arrangement direction of the plurality of the supporting portions, the size of the supporting portion is 1 mm to 1.5 mm.

For example, according to the backlight module provided by at least one embodiment of the present disclosure, the backlight module further includes a light source, the light source is located on the bottom wall, and the gap is configured to transmit at least part of light emitted from the light source, a surface of the connecting portion away from the side wall includes a first side surface, the gap is located between the first side surface and the optical sheet, an angle between the first side surface and a first plane is 20° to 29°, and the first plane is parallel to a surface of the optical sheet facing the bottom wall.

For example, according to the backlight module provided by at least one embodiment of the present disclosure, a surface of the middle frame facing the optical sheet includes a first portion and a second portion that are connected with each other, the plurality of supporting portions are arranged on the first portion, and the gap is located between the second portion and the optical sheet, the gap is configured to transmit at least part of light emitted from the light source.

For example, according to the backlight module provided by at least one embodiment of the present disclosure, a minimum distance between a surface of the connecting portion facing the side wall and the first side surface is 8 mm to 9 mm.

For example, according to the backlight module provided by at least one embodiment of the present disclosure, the surface of the connecting portion away from the side wall further includes a second side surface and a third side surface, the first side surface is connected with the second side surface, the second side surface is connected with the third side surface, the third side surface is closer to the bottom wall than the first side surface, and an angle between the second side surface and the first plane is 60° to 65°.

For example, according to the backlight module provided by at least one embodiment of the present disclosure, a surface of each of the plurality of supporting portions facing the optical sheet is parallel to the first plane, and a cross section of the supporting portion taken by the second plane is triangular, and the second plane is perpendicular to the first plane and perpendicular to an arrangement direction of the plurality of the supporting portions.

For example, according to the backlight module provided by at least one embodiment of the present disclosure, each of the plurality of supporting portions and the middle frame are of an integrated structure and are made of a same material.

For example, according to the backlight module provided by at least one embodiment of the present disclosure, an orthographic projection of the middle frame on the first plane is in a shape of a rectangular ring.

For example, according to the backlight module provided by at least one embodiment of the present disclosure, a count of supporting portions among the plurality of supporting portions in a length direction of the rectangular ring is 20 to 30; a count of supporting portions among the plurality of supporting portions in a width direction of the rectangular ring is 12 to 18.

For example, according to the backlight module provided by at least one embodiment of the present disclosure, in a normal direction of the first plane, a minimum distance between the optical sheet and the bottom wall is 28 mm to 35 mm.

For example, according to the backlight module provided by at least one embodiment of the present disclosure, a surface of the connecting portion away from the side wall includes a first side surface, an angle between the first side surface and a first plane is 60° to 65°, and the first plane is parallel to a surface of the optical sheet facing the bottom wall.

For example, according to the backlight module provided by at least one embodiment of the present disclosure, a surface of the middle frame away from the side wall further includes a second side surface, the first side surface is connected with the second side surface, the second side surface is closer to the bottom wall than the first side surface, an angle between the second side surface and the first plane is 85° to 90°.

For example, according to the backlight module provided by at least one embodiment of the present disclosure, each of the plurality of supporting portions and the middle frame are of separate structures and are made of different materials.

For example, according to the backlight module provided by at least one embodiment of the present disclosure, the supporting portion includes a transparent material.

For example, according to the backlight module provided by at least one embodiment of the present disclosure, a size of each of the plurality of supporting portions in a normal direction of the first plane is 7 mm to 7.5 mm.

For example, according to the backlight module provided by at least one embodiment of the present disclosure, in a normal direction of a first plane, a minimum distance between the optical sheet and the bottom wall is 38 mm to 42 mm, and the first plane is parallel to a surface of the optical sheet facing the bottom wall.

For example, according to the backlight module provided by at least one embodiment of the present disclosure, a cross section of each of the plurality of supporting portions taken by a third plane is quadrilateral, and an interval is provided between the first side surface and an end surface of the supporting portion close to a center of the optical sheet, the third plane is perpendicular to the first plane, and the third plane is perpendicular to an arrangement direction of the plurality of the supporting portions.

For example, according to the backlight module provided by at least one embodiment of the present disclosure, a size of the supporting portion in a normal direction of the first plane is 1.5 mm to 2 mm.

At least one embodiment of the present disclosure further provides a display device, including: the backlight module as described in above embodiments and a display panel, the display panel is located at a side of the backlight module away from the bottom wall, the backlight module is configured to provide backlight to the display panel.

BRIEF DESCRIPTION OF DRAWINGS

Hereinafter, the drawings accompanying embodiments of the present disclosure are simply introduced in order to more clearly explain technical solution(s) of the embodiments of the present disclosure. Obviously, the described drawings below are merely related to some of the embodiments of the present disclosure without constituting any limitation thereto.

DETAILED DESCRIPTION

In order to make objectives, technical details, and advantages of the embodiments of the present disclosure more clear, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first", "second", etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

The features of "vertical", "parallel" and "same" used in the embodiment of the present disclosure all include the features of "vertical", "parallel" and "same" in the strict sense, and the situations that "approximately vertical", "approximately parallel" and "approximately same" contain certain errors. Considering the measurement and the error related to the measurement of a specific quantity (that is, the limitation of the measurement system), those expressions are within the acceptable deviation range for a specific value determined by ordinary people in the field. The "center" in the embodiment of the present disclosure may include a strictly geometric center position and a roughly central position in a small area around the geometric center.

Figure 1:
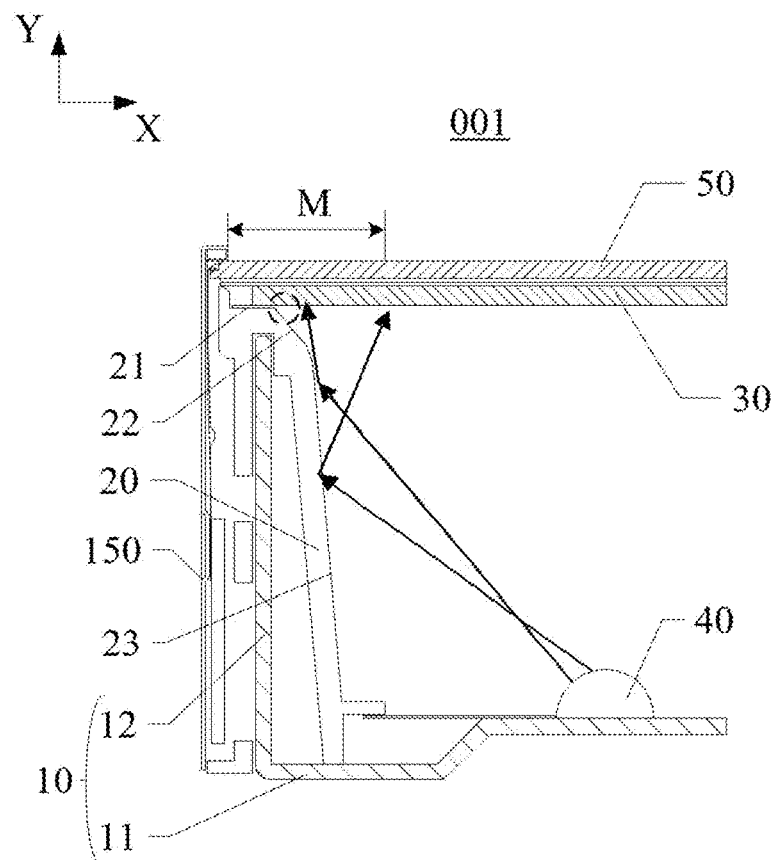
FIG. 1 is a schematic partial cross-sectional view of a display device.
Figure 2:
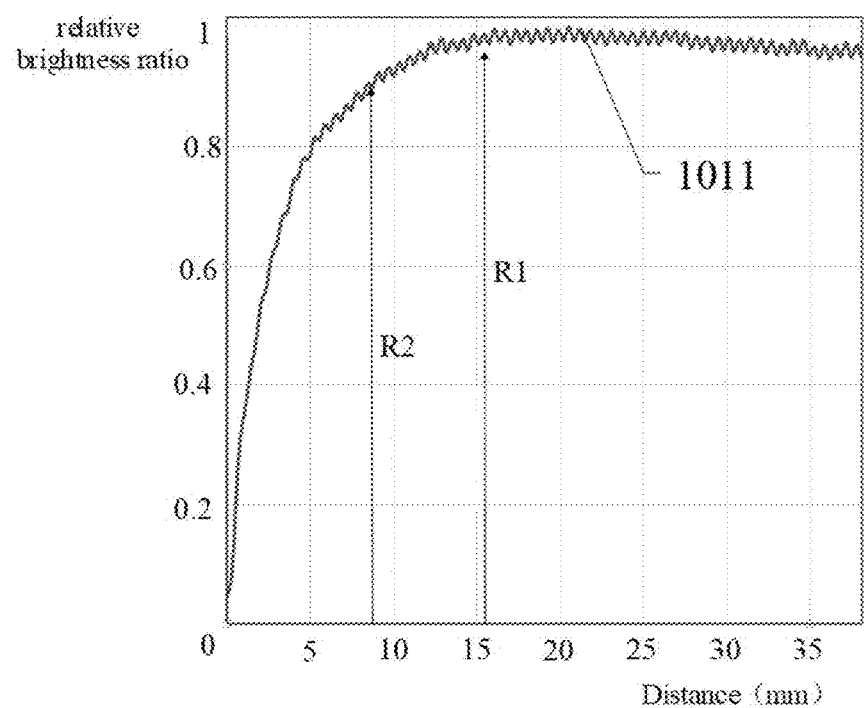
FIG. 2 is a schematic diagram of a brightness curve of the display device in FIG. 1.

FIG. 1 is a schematic partial cross-sectional view of a display device. FIG. 2 is a schematic diagram of a brightness curve of the display device in FIG. 1.

As illustrated in FIG. 1, a display device 001 includes a backplane 10, a middle frame 20, an optical sheet 30, a light source 40 and a display panel 50. The backplane 10 includes a bottom wall 11 and a side wall 12, at least part of the middle frame 20 covers the side wall 12 and is located outside the side wall 12, and the light source 40 is located on the bottom wall 11 and is arranged opposite to the optical sheet 30. For example, an end of the middle frame 20 close to the optical sheet 30 includes a horizontal surface 21, and a size of the horizontal surface 21 in a first direction X is about 3 mm, an edge portion of the optical sheet 30 laps the horizontal surface 21 of the middle frame 20, so that it can be fixed thereon. For example, a size of the edge portion of the horizontal surface 21 of the middle frame 20 that laps the optical sheet in the first direction X is approximately 2 mm. For example, the middle frame 20 further includes a first inclined surface 22 which is connected to the horizontal surface 21, because of a limitation of the minimum molding material thickness of the middle frame 20, a maximum angle between the first inclined surface 22 and the horizontal surface 21 is approximately 49°. For example, the middle frame 20 may include a second inclined surface 23 which is connected to the first inclined surface 21, and an angle between the second inclined surface 23 and the horizontal surface 21 is greater than an angle between the first inclined surface 22 and the horizontal surface 21. The optical sheet 30 is irradiated on by light from the light source 40 and can be used as a backlight source of the display panel 50 to allow the display panel 50 to perform display. For example, the display device 001 may be a liquid crystal display device, and the display panel 50 may include a glass substrate, but is not limited thereto.

For example, as illustrated in FIG. 1, the light emitted from the light source 40 can be directly irradiated on the optical sheet 30, or be irradiated on the middle frame 20 and then reach the optical sheet 30 after reflection. However, because the edge portion of the optical sheet 30 continuously laps the middle frame 20, the light from the light source 40 cannot be directly transmitted through a region between the edge portion and the middle frame 20, and the edge portion of the optical sheet 30 can only receive light incident on other positions of the optical sheet 30 and then transmitted through an interior of the optical sheet 30, which causes brightness of the edge portion to be low and cannot provide backlight brightness that meets setting requirements. In this case, the above-mentioned edge portion of the optical sheet 30 may appear as a "dark region" in the case where the display device 001 displays, for example, it may appear as a "dark frame" (i.e., a small dark band, with a wide approximately 2 mm and located at an edge of a display screen) and the like, therefore, this design scheme easily affects user's visual effect and damages an aesthetic of the display device.

For example, as illustrated in FIG. 1, because a distance between a portion close to the edge portion of the optical sheet 30 (for example, a region circled by a dotted line as illustrated in FIG. 1) and the middle frame 20 is relatively close, the light is hard to reach, and an amount of light entering is less. The brightness of the region near the edge portion of the optical sheet 30 will gradually decrease, which causes the display panel 50 to have a "brightness decay region" close to the edge portion of the optical sheet 30. For example, the "brightness decay region" of the display panel 50 can be a region close to the edge portion of the optical sheet 30, and the brightness of the "brightness decay region" is lower than a normal display brightness. For example, some display panels may have a decrease in brightness starting about 20 mm from their edges.

For example, as illustrated in FIG. 2, the abscissa refers to a distance from a position point in the display region of the display panel 50 to the edge of the display panel 50, and the ordinate refers to a relative brightness ratio between the brightness at the position point and the brightness at the center region of the screen. For example, as illustrated in FIG. 1 and FIG. 2, in the first direction X, for the backlight module 001, in the case where a brightness test is carried out for a part of the display panel 50 at one side, it can be seen that a size M of the "brightness decay region" of the display panel 50 is about 16 mm (referring to a position indicated by a vertical arrow R1 in FIG. 2), in addition, at a position of about 8 mm from the edge of the display panel 50 near the above edge portion of the optical sheet 30 to the center region of the "brightness decay region" (referring to a position indicated by a vertical arrow R2 in FIG. 2), the brightness of the display panel 50 decays to 90% of the normal display brightness. Therefore, the "brightness decay region" of the display panel 50 will severely damage the uniformity of the display image. In addition, in the case where the display panel 50 has a "dark frame" when displaying, even if an actual width of the seam between two adjacent liquid crystal modules that are spliced to each other is small (for example, about 3.2 mm), a width of a visual seam will increase (for example, may reach 10 mm) when the user visually views the screen, thus making the visual effect of the overall display screen poor.

Therefore, how to reduce the "dark frame" and "brightness decay region" caused by the lapping of the optical sheet 30 and the middle frame 20 to improve the uniformity of the display image, is a technical problem to improve the image quality of the display panel 50, which is of great significance to various display products in the display industry.

At least one embodiment of the present disclosure provides a backlight module, the backlight module includes a backplane, a middle frame, and an optical sheet, the backplane includes a bottom wall and a side wall, the side wall is connected with the bottom wall and arranged at a periphery of the bottom wall, and the bottom wall and the side wall form a receiving cavity; the middle frame is arranged around a circumference of the side wall, and the side wall is configured to support the middle frame; the optical sheet is located at a side of the middle frame away from the bottom wall and arranged opposite to the bottom wall, the middle frame includes a connecting portion covering the side wall and located at an end of the side wall away from the bottom wall, a plurality of supporting portions are arranged on a surface of the connecting portion facing the optical sheet and are configured to support the optical sheet, and the plurality of supporting portions are arranged at intervals, a gap is provided between the optical sheet and a surface of a part of the middle frame facing the optical sheet and located between adjacent supporting portions.

At least one embodiment of the present disclosure further provides a display device, the display device includes the above-mentioned backlight module and a display panel, the display panel is located at a side of the backlight module away from the bottom wall, and the backlight module is configured to provide backlight to the display panel.

In the backlight module provided by the embodiment of the present disclosure, by arranging a plurality of supporting portions arranged at intervals on the surface of the connecting portion of the middle frame facing the optical sheet, and providing a gap between the optical sheet and the surface of a part of the middle frame facing the optical sheet and located between adjacent supporting portions, light from the light source can be irradiated into the gap, thereby reducing the "dark region" produced when the middle frame laps the optical sheet, and effectively alleviating the brightness decay phenomenon in the region close to the supporting portion of the display panel to improve the uniformity of the display image.

The display panel and a manufacturing method thereof and a display device provided by the embodiments of the present disclosure will be described below with reference to the accompanying drawings.

Figure 3:
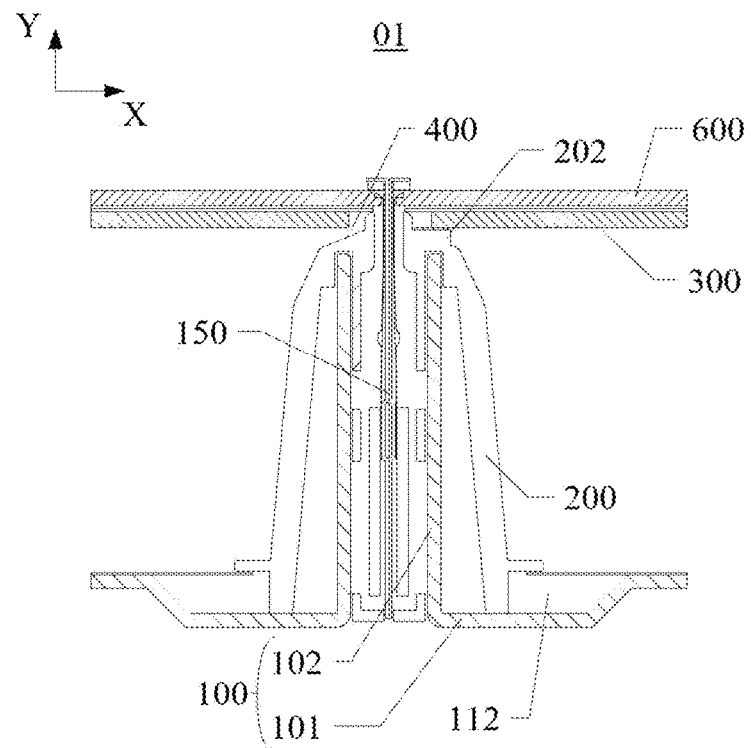
FIG. 3 is a schematic cross-sectional view of a display device provided by at least one embodiment of the present disclosure.
Figure 4:
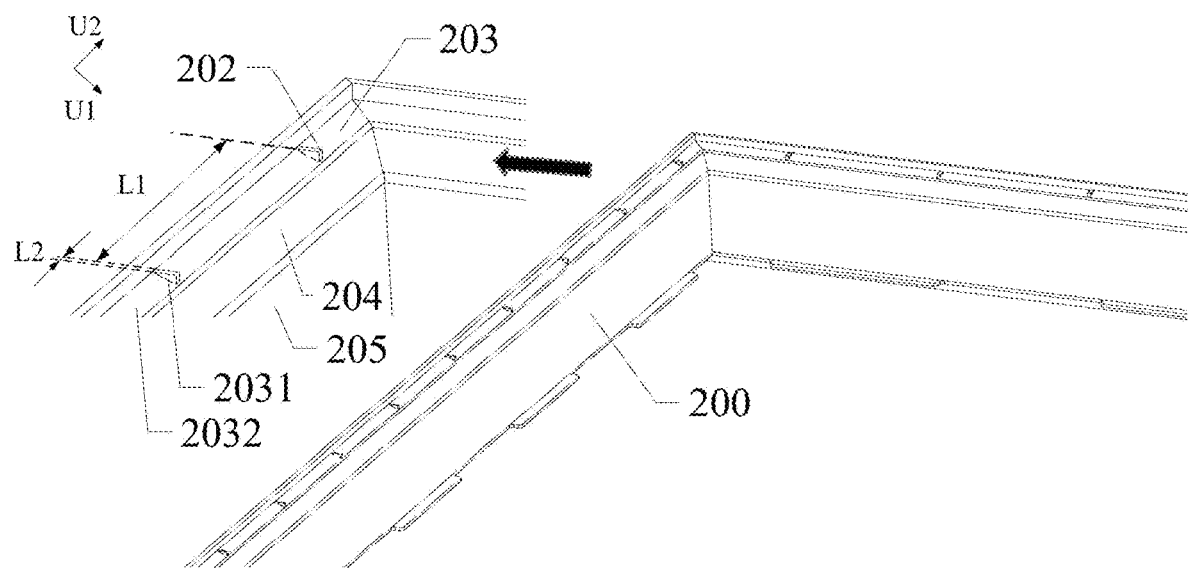
FIG. 4 is a schematic diagram of a supporting structure arranged on a middle frame of a display device provided by at least one embodiment of the present disclosure.
Figure 5:
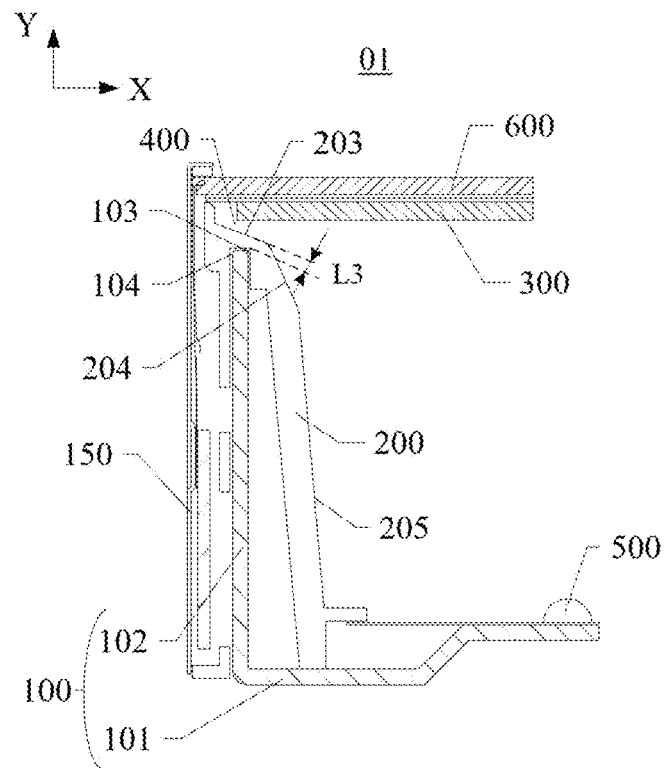
FIG. 5 is a schematic partial diagram of the display device in FIG. 3.
Figure 6:
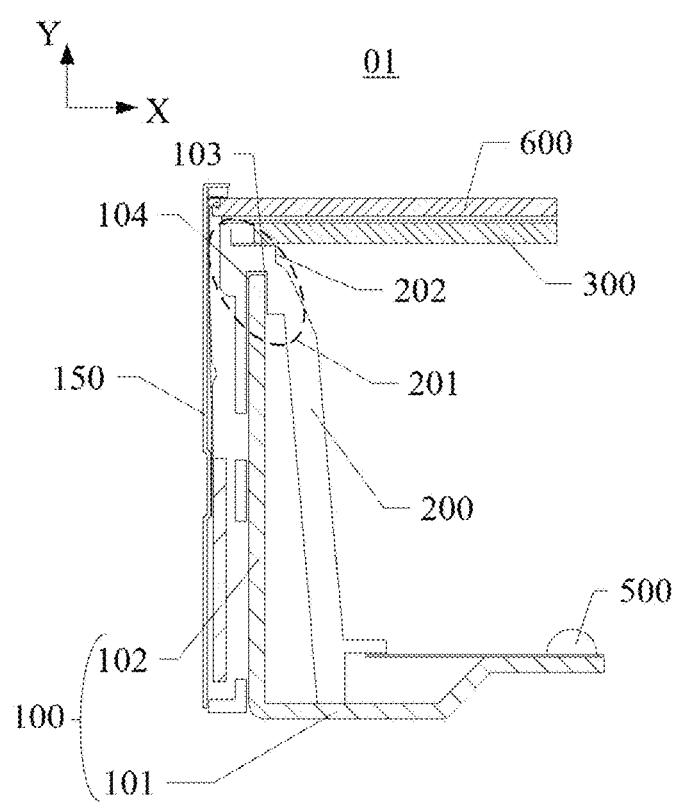
FIG. 6 is another schematic partial diagram of the display device in FIG. 3.
Figure 7:
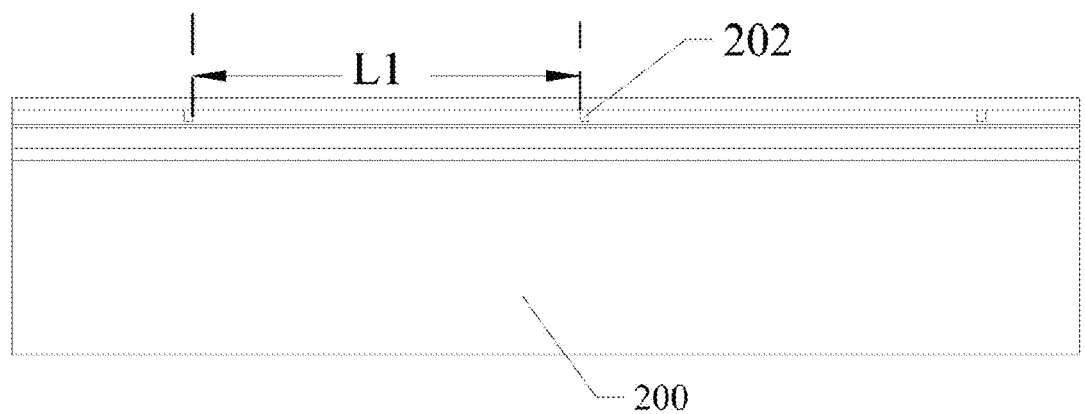
FIG. 7 is a schematic partial structure diagram of the middle frame in FIG. 4.

FIG. 3 is a schematic cross-sectional view of a display device provided by at least one embodiment of the present disclosure; FIG. 4 is a schematic diagram of a supporting structure arranged on a middle frame of a display device provided by at least one embodiment of the present disclosure; FIG. 5 is a schematic partial diagram of the display device in FIG. 3; FIG. 6 is another schematic partial diagram of the display device in FIG. 3; FIG. 7 is a schematic partial structure diagram of the middle frame in FIG. 4.

As illustrated in FIG. 3, a backlight module in a display device 01 includes a backplane 100, a middle frame 200 and an optical sheet 300. The backplane 100 includes a bottom wall 101 and a side wall 102, the side wall 102 is connected to the bottom wall 101 and is arranged at a periphery of the bottom wall 101, the bottom wall 101 and the side wall 102 form a receiving cavity 112. For example, the bottom wall 101 and the side wall 102 can be of an integral structure, and can be made of the same material, but are not limited thereto. For example, the backplane 100 can play an important supporting role in the entire backlight module. For example, the material of the backplane 100 may include electrolytic zinc-plated steel plate with lead (steel electrodeposition cold common, SECC), which is low in cost and easy to process and manufacture.

As illustrated in FIG. 3, the optical sheet 300 is located at a side of the middle frame 200 away from the bottom wall 101 and arranged opposite to the bottom wall 101. For example, the optical sheet 300 can make the light incident to its interior more uniform. For example, the optical sheet 300 may include one or more film layers. For example, the optical sheet 300 may include a diffusion plate. For example, the material of the diffusion plate may be polystyrene (PS), but is not limited thereto. For example, a display panel 600 configured for displaying is provided at a side of the optical sheet 300 away from the bottom wall 101. For example, the optical sheet 300 may further include structures such as a prism sheet, a diffuser sheet, a brightness balance plate, and a brightness enhancement film located between the diffuser plate and the display panel 600 to make the light more uniform and improve the display quality of the display panel 600, which are not limited to this. For example, the backlight module further includes an outer frame 150, the outer frame 150 is located at a side of the middle frame 200 away from the light source 500, and the outer frame 150 can be configured to fix the display panel 600 and protect the display device composed of the backlight module and the display panel 600.

As illustrated in FIG. 3, the middle frame 200 is arranged around the circumference of the side wall 102, and the side wall 102 is configured to support the middle frame 200. For example, an end of the middle frame 200 away from the optical sheet 300 is located in the receiving cavity 112 and is in contact with the bottom wall 101 of the backplane 100. An end of the middle frame 200 away from the bottom wall 101 is connected to the side wall 102 for fixation. For example, the material of the middle frame 200 may include polycarbonate (PC), but is not limited thereto. For example, the middle frame 200 may be white to have strong reflective performance, but is not limited thereto.

As illustrated in FIG. 3 and FIG. 6, the middle frame 200 includes a connecting portion 201 and located at an end of the side wall 102 away from the bottom wall 101, and connecting portion 201 covers the side wall 102 and is located outside the side wall 102, the connecting portion 201 can make a stable connection between the middle frame 200 and the side wall 102. A plurality of supporting portions 202 are provided on a surface of the connecting portion 201 facing the optical sheet 300, and the plurality of supporting portions 202 are configured to support the optical sheet 300. For example, the supporting portion 202 can be made by an injection molding process and serve as a reinforcing rib, but is not limited thereto. The middle frame 200 is connected with the optical sheet 300 through the supporting portion 202 to provide supporting force for the optical sheet 300. For example, a surface of the end of the side wall 102 away from the bottom wall 101 may include a curved surface, but is not limited thereto, the shape of the end of the side wall 102 away from the bottom wall 101 is not limited in the embodiments of the present disclosure.

As illustrated in FIG. 3, FIG. 4 and FIG. 5, the plurality of supporting portions 202 are arranged at intervals on the surface of the connecting portion 201, a gap 400 is provided between the optical sheet 300 and a surface of a part of the middle frame 200 facing the optical sheet 300 and located between adjacent supporting portions 202. For example, the surface of the part of the middle frame 200 facing the optical sheet 300 and located between adjacent supporting portions 202 is spaced apart from the optical sheet 300. The backlight module further includes a light source 500, the light source 500 is located on the bottom wall 101, and the light source 500 is configured to emit light and allow its light to reach the optical sheet 300. For example, the gap 400 is configured to transmit at least a part of the light emitted from light source 500.

Therefore, as illustrated in FIG. 5, light can enter the gap 400, so that an edge portion of the optical sheet 300 facing the gap 400 can be illuminated, so that the brightness of the edge portion of the optical sheet 300 can be significantly improved, and thereby reducing the "dark region" generated in the case where the connecting portion 201 laps the optical sheet 300, so that the overall brightness of the optical sheet 300 has uniformity; furthermore, with such an arrangement, a risk of brightness decay in the edge region of the display panel 600 close to the supporting portion 202 can be effectively reduced, which is beneficial to improving the display effect of the display panel 600.

For example, the above design scheme adopted in at least one embodiment of the present disclosure can be used for splicing liquid crystal modules to solve problems such as dark frames appearing on the edges of spliced liquid crystal modules, thereby improving the image displaying quality at the edge portion of the spliced liquid crystal modules. For example, this technical scheme can be based on an "extreme frame splicing LCD module" or an "extremely narrow frame splicing LCD module", that is, it can be based on a splicing LCD module with a narrow frame (for example, a width of the seam between two LCD modules spliced to each other is approximately 3.2 mm). By designing structures of the middle frame and the supporting portion of the backlight module, the embodiments of the present disclosure can effectively reduce the dark frame caused by the lapping of the supporting portion and the optical sheet, and reduce an area of the brightness decay region of the edge portion of the spliced liquid crystal module.

For example, as illustrated in FIG. 4, the plurality of supporting portions 202 are arranged at intervals along the edge of the middle frame 200, and in an arrangement direction of the plurality of supporting portions 202, the minimum distance L1 between two adjacent supporting portions 202 is greater than a size L2 of the supporting portion 202. For example, the edge of the middle frame 200 extends along a direction U1 and a direction U2, for multiple supporting portions 202 provided on a part of the first side surface 203 extending along the direction U1, the arrangement direction of the multiple supporting portions 202 is the direction U1, the minimum distance between two adjacent supporting portions 202 is the minimum distance in the direction U1. For multiple supporting portions 202 provided on a part of the first side surface 203 extending along the direction U2, the arrangement direction of the multiple supporting portions 202 is the direction U2, and the minimum distance between two adjacent supporting portions 202 is the minimum distance in the direction U2. For example, for two supporting portions 202 provided on both sides of a corner of the first side surface 203, the arrangement directions of the two supporting portions 202 are direction U1 and direction U2, and the minimum distance between the two supporting portions 202 is a sum of their respective distances from the corner.

With such an arrangement, as illustrated in FIG. 5, more light can be allowed to enter the gap 400, thereby improving the brightness of the edge portion of the optical sheet 300 and reducing the risk of generating "dark region" in the case where the supporting portion 202 laps the optical sheet 300.

For example, as illustrated in FIG. 4, the surface of the middle frame 200 facing the optical sheet 300 includes a first portion 2031 and a second portion 2032, the first portion 2031 is connected with the second portion 2032, and the plurality of supporting portions 202 are arranged on the first portion 2031. For example, as illustrated in FIG. 3 and FIG. 4, a gap 400 is provided between the second portion 2032 and the optical sheet 300, and the gap 400 is configured to transmit at least part of the light emitted from the light source 500. For example, by arranging the supporting portion 202 only on the first portion of the surface of the middle frame 200 facing the optical sheet 300, it is beneficial for light to reach a root portion of the optical sheet 300 through the gap 400 between the second portion 2032 and the optical sheet 300, that is, reach the edge portion of the optical sheet 300, thereby effectively reducing the "dark region" generated in the case where the supporting portion 202 laps the optical sheet 300, and meeting supporting requirements for the optical sheet 300 through the supporting portion 202.

For example, as illustrated in FIG. 4, in the arrangement direction of the plurality of supporting portions 202, the minimum distance L1 between two adjacent supporting portions 202 may be 40 to 60 times the size L2 of the supporting portion 202, for example, it can be at least one of 45 times to 55 times, 40 times to 50 times, 48 times to 52 times, and 53 times to 58 times, but is not limited to this.

With such an arrangement, by setting the minimum distance L1 between two adjacent supporting portions 202 and the size L2 of the supporting portion 202 within a reasonable range, the amount of light entering the above-mentioned gap 400 (as illustrated in FIG. 5) can be increased, thereby more effectively increasing the brightness of the edge portion of the optical sheet 300 to enhance the display effect.

For example, as illustrated in FIG. 4 and FIG. 7, in the arrangement direction of the plurality of supporting portions 202, the minimum distance L1 between two adjacent supporting portions 202 can be 45 mm to 50 mm, for example, it can be at least one of 45 mm to 48 mm, 46 mm to 47 mm, 48 mm to 50 mm and 47 mm to 49 mm, but is not limited thereto.

For example, as illustrated in FIG. 4 and FIG. 7, in some embodiments of the present disclosure, in the arrangement direction of the plurality of supporting portions 202, the minimum distance between two adjacent supporting portions 202 may be equal, so that supporting force received by the optical sheet 300 is uniformly distributed along its circumferential direction, but embodiments of the present disclosure are not limited thereto. For example, in the arrangement direction of the plurality of supporting portions 202, the minimum distance between two adjacent supporting portions 202 may be unequal, for example, it may be adaptively adjusted according to the supporting force required by the optical sheet 300. For example, in the case where local supporting force required by the optical sheet 300 is large, more supporting portions 202 can be provided for this part of the optical sheet 300, and the minimum distance between two adjacent supporting portions 202 can be small, so as to provide sufficient supporting force for the optical sheet 300. For example, in the case where the local supporting force required by the optical sheet 300 is small, fewer supporting portions 202 can be provided for this part of the optical sheet 300, and the minimum distance between two adjacent supporting portions 202 can be made large, which facilitates more light entering the gap 400 (as shown in FIG. 5), thereby improving the brightness of the edge portion of the optical sheet 300, and improving the display effect of the display panel 600.

For example, as illustrated in FIG. 4 and FIG. 7, in the arrangement direction of the plurality of supporting portions 202, the size L2 of the supporting portion 202 can be 1 mm to 1.5 mm, for example, it can be at least one of 1 mm to 1.1 mm, 1.1 mm to 1.2 mm, 1 mm to 1.3 mm, and 1.2 mm to 1.5 mm, but is not limited thereto.

For example, as illustrated in FIG. 4 and FIG. 7, in some embodiments of the present disclosure, in the arrangement direction of the plurality of supporting portions 202, the sizes of the plurality of supporting portions 202 may be equal to facilitate manufacturing process. For example, in some embodiments of the present disclosure, in the arrangement direction of the plurality of supporting portions 202, the sizes of the plurality of supporting portions 202 may not be equal, for example, they may be adaptively adjusted according to the supporting force required by the optical sheet 300. For example, in the case where the local supporting force required by the optical sheet 300 is large, the size of the supporting portion 202 used to support this part of the optical sheet 300 can be made large to provide sufficient supporting force for the optical sheet 300. For example, in the case where the local supporting force required by the optical sheet 300 is small, the size of the supporting portion 202 used to support this part of the optical sheet 300 can be made small to facilitate more light entering the above-mentioned gap 400 (as illustrated in FIG. 5), thereby increasing the brightness of the edge portion of the optical sheet 300 and improving the display effect of the display panel 600.

Figure 8:
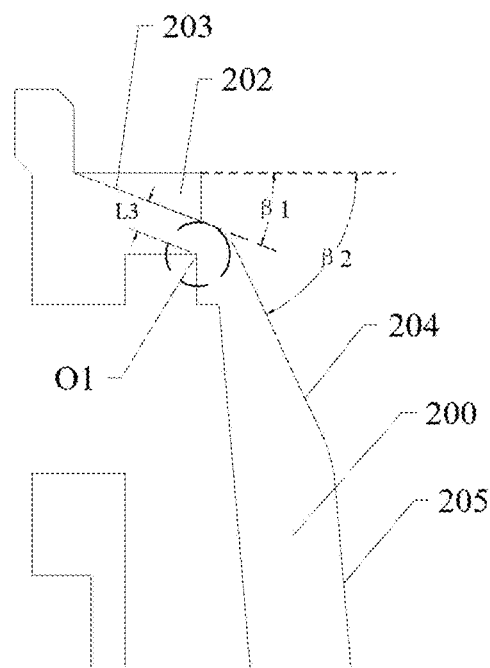
FIG. 8 is a schematic partial cross-sectional view of a middle frame of the display device in FIG. 3.

FIG. 8 is a schematic partial cross-sectional view of a middle frame of the display device in FIG. 3.

For example, as illustrated in FIG. 5 and FIG. 8, the surface of the connecting portion 201 away from the side wall 102 includes a first side surface 203, the first side surface 203 and the optical sheet 300 are spaced apart from each other, and a gap between the first side surface 203 and the optical sheet 300 is the above-mentioned gap 400. For example, in the first direction X, the edge of the first side surface 203 away from the light source 500 is closer to the outer frame 150 than the optical sheet 300, which facilitates light irradiating onto the edge of the optical sheet 300.

For example, as illustrated in FIG. 5 and FIG. 8, an angle B1 between the first side surface 203 and a first plane may be 20° to 29°, and the first plane is parallel to the surface of the optical sheet 300 facing the bottom wall 101. For example, by making a reasonable angle between the first side surface 203 and the first plane, it is beneficial to increasing the amount of the light entering the gap 400, so that the brightness of the part of the optical sheet 300 facing the first side surface 203 is high, thereby improving the display effect of the display panel 600.

For example, as illustrated in FIG. 5 and FIG. 8, the angle B1 between the first side surface 203 and the first plane can be at least one of 21° to 24°, 22° to 23°, 21° to 25°, 20° to 22°, 22° to 24°, 23° to 26°, 24° to 28°, 25° to 27°, 26° to 28°, and 24° to 29°, but is not limited thereto, which can be specifically set according to design requirements.

For example, as illustrated in FIG. 5 and FIG. 8, the surface of the connecting portion 201 away from the side wall 102 further includes a second side surface 204 and a third side surface 205, the first side surface 203 is connected to the second side surface 204, and the second side surface 204 is connected to the third side surface 205, and the third side surface 205 is closer to the bottom wall 101 than the first side surface 203. For example, the angle B1 between the first side surface 203 and the first plane is different from the angle β2 between the second side surface 204 and the first plane, and the angle B2 between the second side surface 204 and the first plane is different from the angle between the third side surface 205 and the first plane. For example, the angle between the third side surface 205 and the first plane is larger than the angle B2 between the second side surface 204 and the first plane, and the angle B2 between the second side surface 204 and the first plane is larger than the angle B1 between the first side surface 203 and the first plane, but is not limited thereto. With such an arrangement, it is beneficial to allow the light emitted from the light source 500 to reach the gap 400, thereby increasing the brightness of the edge portion of the optical sheet 300 facing the first side surface 203 and improving the display effect of the display panel 600.

For example, as illustrated in FIG. 5 and FIG. 8, the angle B2 between the second side surface 204 and the first plane can be 60° to 65°, for example, it can be at least one of 60° to 63°, 61° to 64°, 62° to 65°, 62° to 63° and 61° to 62°, but is not limited thereto.

For example, as illustrated in FIG. 5 and FIG. 6, the minimum distance L3 between the surface of the connecting portion 202 facing the side wall 102 and the first side surface 203 is 8 mm to 9 mm. For example, the end portion of the side wall 102 away from the bottom wall 101 may include a first edge 103 and a second edge 104, and the first edge 103 is closer to the first side surface 203 than the second edge 104. For example, the minimum distance between the surface of the connecting portion 202 facing the first edge 103 and the first side surface 203 is L3.

For example, as illustrated in FIG. 5 and FIG. 6, by making the minimum distance L3 between the surface of the connecting portion 202 facing the side wall 102 and the first side surface 203 be 8 mm to 9 mm, the thickness of a part of the connecting portion 201 located between the end portion of the connecting portion 201 and the optical sheet 300 is small, which is beneficial to increasing the distance between the first side surface 203 and the optical sheet 300 and allowing more light to enter the gap 400. For example, the minimum distance L3 between the surface of the connecting portion 202 facing the side wall 102 and the first side surface 203 may be at least one of 8.0 mm to 8.5 mm, 8.2 mm to 8.6 mm, 8.3 mm to 8.7 mm, 8.4 mm to 8.8 mm, and 8.5 mm to 8.9 mm, but is not limited thereto. For example, the middle frame 200 can be made by an injection molding process. By setting the minimum distance L3 between the surface of the connecting portion 202 facing the side wall 102 and the first side surface 203 within the above numerical range, it is beneficial to ensuring that a normal process for manufacturing the middle frame 200 can be carried out normally.

For example, as illustrated in FIG. 4 and FIG. 8, the surface of the supporting portion 202 facing the optical sheet 300 is parallel to the first plane, so that a stable supporting force can be provided for the optical sheet 300 (as illustrated in FIG. 5), and a tilting risk of the optical sheet 300 can be reduced. For example, a cross section of the supporting portion 202 taken by a second plane is triangular, for example, the second plane is perpendicular to the first plane, and the second plane is perpendicular to the arrangement direction of the plurality of supporting portions 202. With such an arrangement, the surface of the supporting portion 202 away from the optical sheet 300 can be attached to the middle frame 200, which is beneficial to a stable arrangement of the supporting portion 202, thereby reducing a risk of dislocation of the supporting portion 202, and further facilitating the manufacturing process.

For example, as illustrated in FIG. 6, in some embodiments of the present disclosure, the supporting portion 202 and the middle frame 200 may be of an integrated structure, and the material of the supporting portion 202 may be the same as the material of the middle frame 200, thereby simplifying the manufacturing process, and facilitating reducing installation steps.

Figure 9:
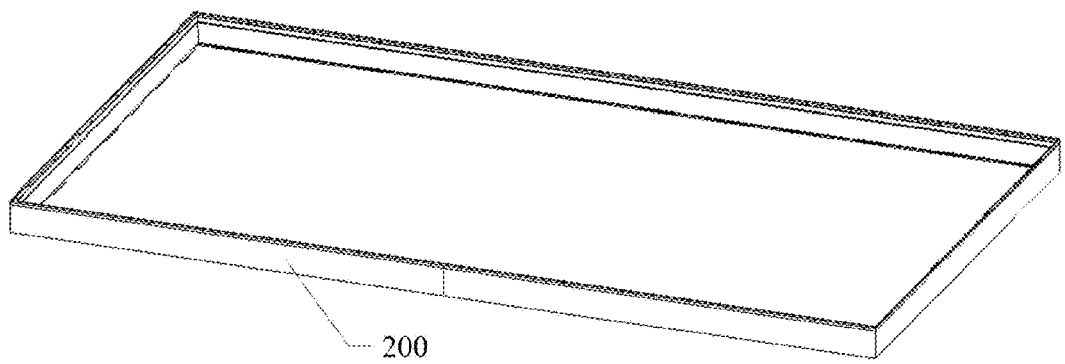
FIG. 9 is a schematic diagram of an overall structure of the middle frame of the display device in FIG. 3.
Figure 10:
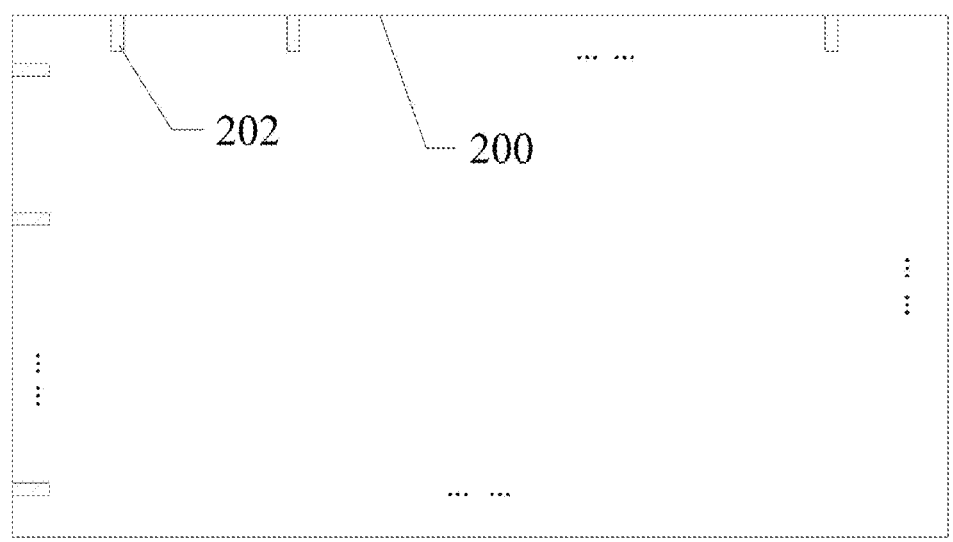
FIG. 10 is a top view of the middle frame in FIG. 9.

FIG. 9 is a schematic diagram of an overall structure of the middle frame of the display device in FIG. 3; FIG. 10 is a top view of the middle frame in FIG. 9.

For example, as illustrated in FIG. 5 and FIG. 9, an orthographic projection of the middle frame 200 of the backlight module on the first plane is in a shape of a rectangular ring, for example, it can be a closed rectangular ring, so that the middle frame can provide stable supporting for the optical sheet 300 in its circumferential direction. For example, in some embodiments of the present disclosure, the orthographic projection of the middle frame 200 on the first plane may be in other shapes, such as a circle, an ellipse, a regular polygon, and the like, which is not limited in the embodiments of the present disclosure.

For example, as illustrated in FIG. 9 and FIG. 10, in the case where the orthographic projection of the middle frame 200 of the backlight module on the first plane is in a shape of a rectangular ring, a count of supporting portions 202 in the length direction of the rectangular ring may be 20 to 30, for example, it can be at least one of 20 to 25, 21 to 26, 22 to 27, 23 to 28, and 24 to 29, but is not limited thereto. For example, in the width direction of the rectangular ring, a count of supporting portions 202 may be 12 to 18, for example, it may be at least one of 13 to 17, 14 to 16, 13 to 15, 12 to 14, and 14 to 15, but is not limited thereto. For example, in the length direction of the rectangular ring, the number of supporting portions 202 may be 26, the distance between two adjacent supporting portions 202 may be 45 mm, and the distance between the supporting portion 202 and the edge of the rectangular ring may be 28 mm to 29 mm; in the width direction of the rectangular ring, the number of supporting portions 202 may be 14, and the distance between the supporting portions 202 and the edge of the rectangular ring may be 17 mm to 18 mm, but is not limited thereto.

For example, as illustrated in FIG. 5 and FIG. 9, by reasonably setting the number of the plurality of supporting portions 202, it is beneficial to having a suitable distance between adjacent supporting portions 202, so as to facilitate light entering the gap 400 between the surface of the part of the middle frame 200 facing the optical sheet 300 and located between adjacent supporting portions 202 and the optical sheet 300, thereby increasing the brightness of the edge portion of the optical sheet 300 to improve the display effect of the display panel 600.

For example, as illustrated in FIG. 5, in the normal direction of the first plane, the minimum distance between the optical sheet 300 and the bottom wall 101 can be 28 mm to 35 mm, for example, it can be at least one of 28 mm to 30 mm, 29 mm to 31 mm, 32 mm to 34 mm, and 33 mm to 35 mm, but is not limited thereto. For example, the minimum distance may further be called a light mixing distance of the backlight module. With such an arrangement, it is beneficial for the light emitted from the light source 500 to reach the optical sheet 300 and be incident into the gap 400, thereby increasing the brightness of the edge portion of the optical sheet 300 and making the overall brightness of the optical sheet 300 uniform. For example, the normal direction of the first plane may be the second direction Y illustrated in FIG. 5.

Figure 11:
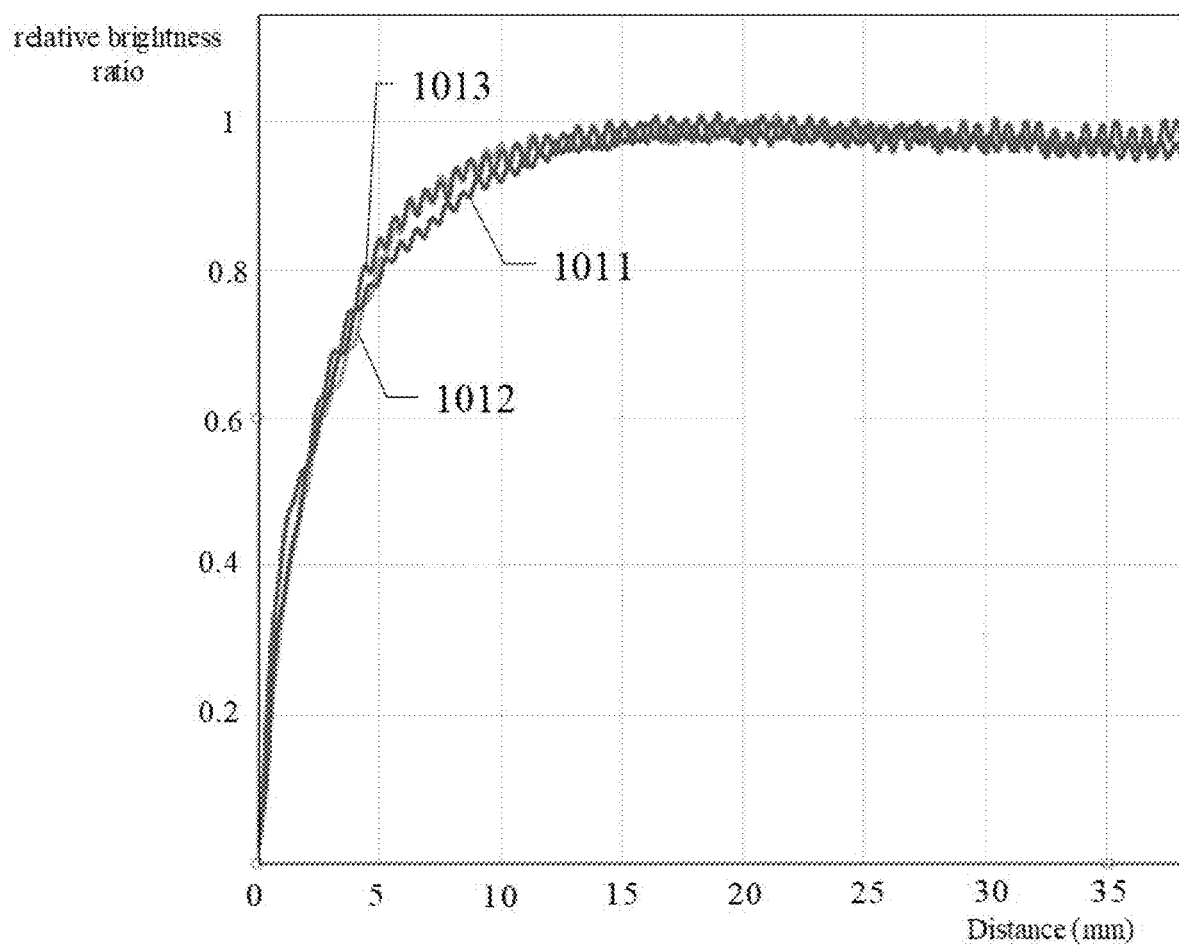
FIG. 11 is a comparison of brightness curves of some display devices.

FIG. 11 is a comparison of brightness curves of some display devices.

For example, in order to test the influence of the angle between the second inclined surface of the middle frame 20 and the horizontal plane on the brightness of the display device, FIG. 11 shows the comparison results of brightness curves of three display devices. The difference between the display device (not illustrated in the figure) corresponding to the brightness curve 1011, the brightness curve 1012 or the brightness curve 1013 and the display device illustrated in FIG. 1 is only in that the structure of the middle frame 20 is different, specifically, the difference is in that the angle between the second inclined surface of the middle frame 20 and the first plane is different, and the other structures are the identical. For example, in the display device corresponding to the brightness curve 1011, the angle between the second inclined surface of the middle frame of the backlight module and the first plane is 50°; in the display device corresponding to the brightness curve 1012, the angle between the second inclined surface of the middle frame of the backlight module and the first plane is 65°; in the display device corresponding to the brightness curve 1013, the angle between the second inclined surface of the middle frame of the backlight module and the first plane is 60°.

For example, as illustrated in FIG. 11, according to the brightness curve 1011, in the case where the distance from a position point in the display region of the display panel to the edge of the display region is about 15 mm, the brightness from this position point to the edge of the display region shows a decay trend. According to the brightness curve 1012, in the case where the distance from a position point in the display region of the display panel to the edge of the display region is about 12 mm, the brightness from this position point to the edge of the display region shows a decay trend. According to the brightness curve 1013, in the case where the distance from a position point in the display region of the display panel to the edge of the display region is approximately 13 mm, the brightness from this position point to the edge of the display region shows a decay trend. It can be seen that in the case where the angle between the second inclined surface of the middle frame of the backlight module and the first plane is larger, it is easier for light to be incident on the edge portion of the optical sheet, thereby making the brightness of the edge portion of the display panel be closer to the brightness of the display region of the display panel.

However, for the middle frame made by injection molding process, in order to achieve high product molding rate and product yield, and to have the possibility of mass production, the minimum material thickness of the middle frame needs to be not less than 0.8 mm. Therefore, the angle between the second inclined surface of the middle frame and the first plane cannot be increased infinitely. For example, in some embodiments, in the case where the angle between the second inclined surface of the middle frame and the first plane is 70°, although the brightness curve of the display device shows some advantages, the brightness improvement for the edge portion of the optical sheet in this scheme is not obvious, and the material thickness of the middle frame will be less than 0.8 mm, therefore, it does not meet the requirements of the injection molding process, and the possibility of actual mass production is low.

In addition, in a case of trying not to change the height of the outer frame so that the minimum distance between the optical sheet and the bottom wall remains basically unchanged in the normal direction of the first plane, and considering the amount of light entering the edge of the optical sheet and the possibility of mass production of the product, the display device corresponding to the brightness curve 1012 can be selected, that is, the angle between the second inclined surface of the middle frame of the backlight module and the first plane is 65°, so as to reduce the area of the brightness decay region close to the edge portion of the optical sheet of the display panel.

For example, referring to FIG. 1, in order to facilitate adjusting the angle between the second inclined surface 23 and the first plane 21, the following measures can be taken: for example, the backplane 10 can be moved by about 0.6 mm to 0.8 mm in a direction away from the display region of the display panel 50. For example, the size of the outer frame 150 in the first direction X can be reduced to reduce an occupied space. For example, the size of the outer frame 150 in the first direction X can be reduced by 0.8 mm to 1.4 mm, for example, it can be 0.8 mm to 1.0 mm, 1.0 mm to 1.2 mm or 0.9 mm to 1.3 mm, but is not limited thereto. For example, in order to ensure the support strength, the size of the middle frame 20 in the first direction X can be increased, but is not limited thereto.

For example, according to the brightness curve results illustrated in FIG. 11, in the embodiment of the present disclosure, in the case where the angle between the second inclined surface of the middle frame of the backlight module and the first plane is 65°, in order to make the light irradiate on the edge portion of the optical sheet and reduce the risk of a "dark frame" on the display panel during display, it is necessary to maximize the angle between the first inclined surface and the first plane as much as possible while considering that the minimum material thickness of the middle frame is not less than 0.8 mm.

For example, as illustrated in FIG. 3 and FIG. 8, the position O1 where the middle frame 200 matches the end portion of the side wall 102 is taken as a center to draw a dotted circle with the radius of 0.8 mm, then the plane connected to the second side surface 204 and being a tangent plane of the dotted circle is the first side surface 203, so the angle between the first side surface 203 and the first plane can be determined.

Figure 12:
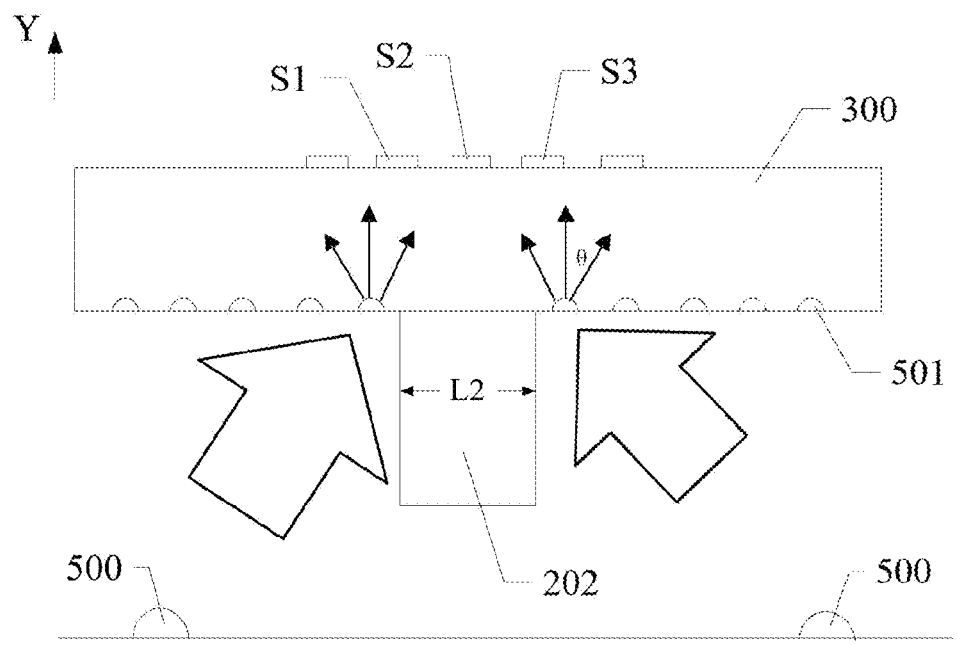
FIG. 12 is a schematic partial cross-sectional view of a backlight module.
Figure 13:
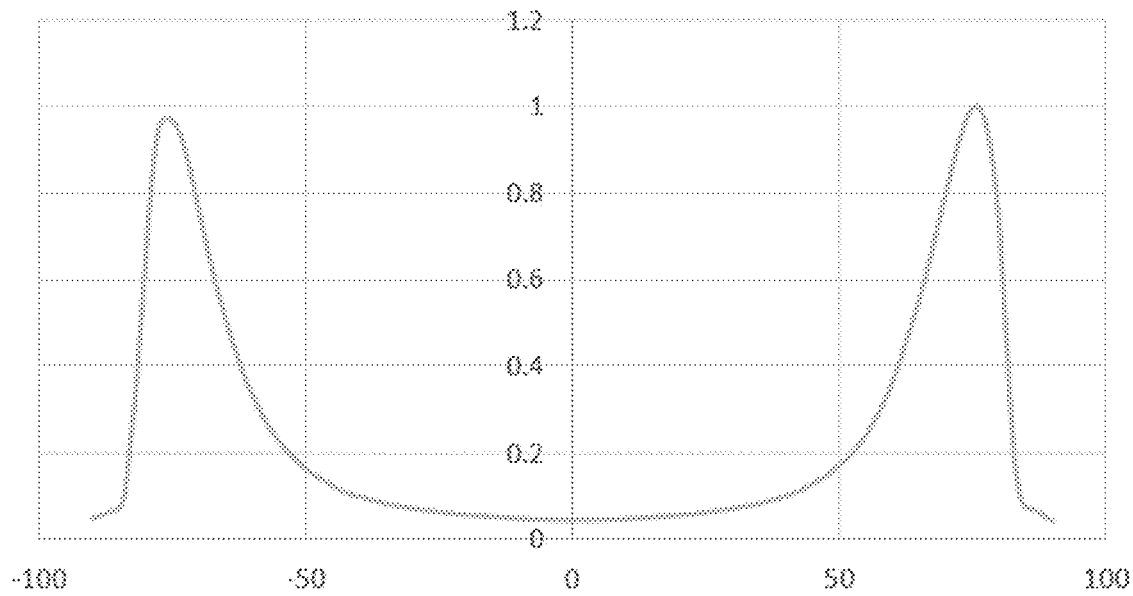
FIG. 13 is a schematic diagram of a light intensity of a light source in FIG. 12.

FIG. 12 is a schematic partial cross-sectional view of a backlight module; FIG. 13 is a schematic diagram of a light intensity of a light source in FIG. 12.

For example, referring to FIG. 12, the light emitted from the light source 500 is incident on the optical sheet 300, and the surface of the optical sheet 300 close to the supporting portion 202 can be formed with a plurality of tiny light source units 501. It should be noted that the light source unit 501 is not an actual light source, the light source unit 501 may be a unit obtained by micronizing the surface of the optical sheet 300 after the light from the light source 500 is incident on the surface. For example, the light may exit from the light source unit 501, be transmitted through the interior of the optical sheet 300, and then reach the surface of the optical sheet 300 away from the supporting portion 202. For example, the luminous intensity received by each position point (for example, position point S1, position point S2, position point S3) of the surface of the optical sheet 300 away from the supporting portion 202 can be calculated according to the following formula:

$$Ev = Iv \times \cos\theta / r^2$$

in the formula, Ev refers to the luminous intensity; Iv refers to the intensity of light exiting from the surface of the light source unit; θ refers to the angle between the light exiting direction of the light source unit and the second direction; r refers to the size of the optical sheet in the second direction Y.

For example, as illustrated in FIG. 12, combined with the above formula, in the case where the light exiting direction of the light source unit 501 is the second direction Y, that is, the angle between the light exiting direction and the second direction Y is 0°, the luminous intensity of the light source unit 501 is maximum. In the case where the angle between the light exiting direction of the light source unit 501 and the second direction Y gradually increases from 0°, for example, in the case where the light exiting direction of the light source unit 501 gradually approaches the supporting portion 202, the luminous intensity of light exiting from the light source unit 501 gradually decreases.

For example, as illustrated in FIG. 12, the position point S1 at least partially overlaps the supporting portion 202 in the second direction Y, the position point S3 at least partially overlaps the supporting portion 202 in the second direction Y, and an orthographic projection of the position point S2 on the optical sheet 300 completely falls into an orthographic projection of the supporting portion 202 that is opposite to the position point S2 on the optical sheet 300. Because the position point S1, the position point S2 or the position point S3 receives light exiting from multiple light source units 501 at the same time, the luminous intensity of each position point is a sum of the intensity of the light received from the multiple light source units 501. Therefore, luminous intensity at position point S1 and luminous intensity at position point S3 are greater than the luminous intensity at position point S2. At the same time, through testing the backlight module, it can be seen that in the arrangement direction of multiple supporting portions 202, in the case where the size of the supporting portion 202 is 1 mm, when visually observed, the luminous intensity at the position point S2 is basically equal to the luminous intensity at the position point S1 or the luminous intensity at the position point S3. Therefore, by making the size of the supporting portion 202 in the arrangement direction of the plurality of supporting portions 202 to be 1 mm, the risk of generating a dark frame when the supporting portion 202 laps the optical sheet 300 can be reduced.

For example, as illustrated in FIG. 13, the abscissa refers to the angle between the light emitting direction of the light source 500 and the second direction Y, and the ordinate refers to the light emitting intensity of the light source 500. According to FIG. 13, it can be seen that the light emitting intensity of the light source 500 is related to the light emitting angle, and the light emitting angle of the light source 500 is the angle between the emitting light and the second direction Y. According to FIG. 13, in the case where the angle between the light emitting direction of the light source 500 and the second direction Y is 75°, the light emitting intensity of the light source 500 is maximum, but the embodiments of the present disclosure are not limited thereto. For example, the angle between the light emitting direction of the light source and the second direction Y can be set according to design requirements.

For example, referring to FIG. 12, by further building a verification model for verification, it can be found that in the arrangement direction of multiple supporting portions 202, in the case where the size of the supporting portion 202 is greater than 2 mm, for example, 5 mm, the display screen of the display device will appear an obvious dark frame. For example, in the case where the size of the supporting portion 202 is 1.5 mm, the dark frame of the display screen of the display device is basically invisible when observed from a front viewing angle, and the display screen of the display device has a slight dark frame when observed from an inner viewing angle of 60°. For example, in the case where the size of the supporting portion 202 is 1.3 mm, when observed from the front viewing angle, the dark frame of the display screen of the display device is invisible, and the quality of the display screen is good, when observed from the internal viewing angle of 60°, the display screen of the display device has a slight dark frame. For example, in the case where the size of the supporting portion 202 is 1.0 mm, when observed from the front viewing angle, the dark frame of the display screen of the display device is invisible, and the quality of the display screen is good, when observed from the internal viewing angle of 30°, the display screen of the display device has a slight, and almost invisible dark frame. For example, observing from the front viewing angle may be observing from a viewing angle where the sight is perpendicular to the display panel, and observing from an inner viewing angle may be observing from a viewing angle such as 45° between the sight and the display panel.

Therefore, it can be seen from FIG. 12 to FIG. 13 that, considering the display effect of the display device and the difficulty of manufacturing process, the size of the supporting portion 202 in the arrangement direction of the multiple supporting portions 202 is preferably 1 mm, so that the display effect of the display panel can be improved.

Based on this, in some embodiments of the present disclosure, for example, in the backlight module of the display device illustrated in FIG. 3, the middle frame 200 and the optical sheet 300 do not adopt a continuous lapping scheme. For example, the angle between the first side surface 203 of the backlight module and the first plane may be 21°, and the angle between the second side surface 204 and the first plane may be 65°. The plurality of supporting portions 202 are arranged at intervals, and in the arrangement direction of the plurality of supporting portions 202, the minimum distance L1 between two adjacent supporting portions 202 may be set to 45 mm, and the size L2 of the supporting portion 202 may be 1 mm. Accordingly, the verification results for this backlight module are illustrated in FIG. 14 and FIG. 15.

Figure 14:
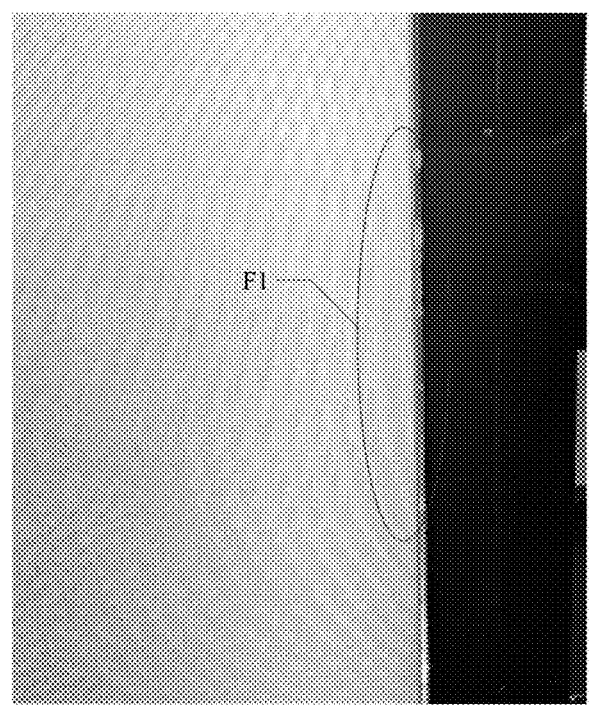
FIG. 14 is a schematic partial diagram of a display region of the display device in FIG. 3.

FIG. 14 is a schematic partial diagram of a display region of the display device in FIG. 3; FIG. 15 is a comparison of brightness curves for other display devices.

For example, as illustrated in FIG. 3 and FIG. 14, when the display panel 600 is visually observed, the brightness of the display panel 600 is uniform and the quality of the display screen is good. For example, in an edge region F1 of the display panel illustrated in FIG. 14, no dark frame is generated due to the lapping of the supporting portion 202 and the optical sheet 300.

Figure 15:
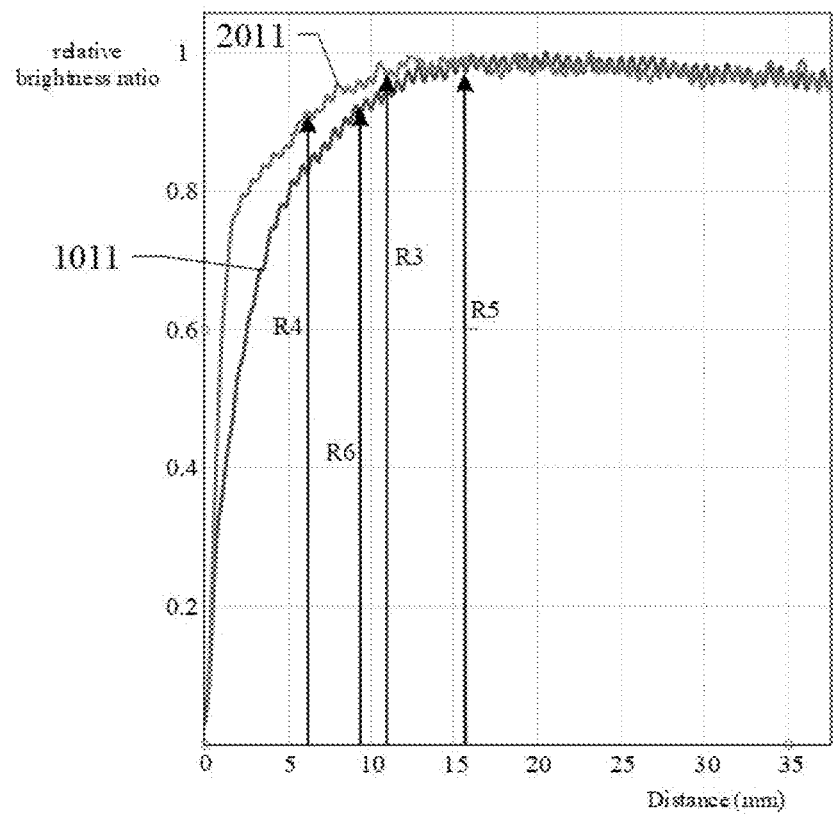
FIG. 15 is a comparison of brightness curves for other display devices.

For example, as illustrated in FIG. 3 and FIG. 15, the brightness curve 2011 corresponds to the display device illustrated in FIG. 3. The difference between the display device corresponding to the brightness curve 1011 and the display device illustrated in FIG. 1 is only in that the structure of the middle frame is different, specifically, in the display device corresponding to the brightness curve 1011, the angle between the second side surface of the middle frame of the backlight module 001 and the first plane is 50°.

For example, as illustrated in FIG. 3 and FIG. 15, according to the brightness curve 2011 of the display device, in the case where a distance from a position point in the display region of the display panel 600 to the edge of the display region is about 10 mm to 11 mm (referring to the vertical arrow R3), the brightness from this position point to the edge of the display region shows a decay trend. In the case where a distance from a position point in the display region of the display panel 600 to the edge of the display region is 5 mm to 6 mm (referring to the vertical arrow R4), the brightness of the display panel 600 decays to 90% of that of the normal display region. For example, according to the brightness curve 1011, in the case where a distance from a position point in the display region of the display panel to the edge of the display region is about 15 mm (referring to vertical arrow R5), the brightness from this position point to the edge of the display region shows a decay trend. In the case where a distance from a position point in the display region of the display panel to the edge of the display region is approximately 8 mm (referring to vertical arrow R6), the brightness of the display panel 600 decays to 90% of that of the normal display region. At the same time, in the case where the distance from a position point in the display region of the display panel 600 to the edge of the display region is 0 to 3 mm, the brightness of the display device corresponding to the brightness curve 2011 changes rapidly, and the brightness curve 2011 presents a "steep" trend, however, the brightness curve 2011 shows a "flat" trend, which can explains that the trend of the brightness curve 2011 is greatly affected by the "dark frame" in the display device.

In conjunction with FIG. 11 to FIG. 15, the above design scheme provided by the embodiment of the present disclosure can greatly increase the amount of light entering the gap 400 (referring to FIG. 5), and allow the light to illuminate the root portion of the optical sheet 300 (that is, the edge portion of the optical sheet 300 close to the middle frame 200), thereby effectively solving the problem that a dark frame may be generated by lapping of the optical sheet 300 and the middle frame 200, optimizing the edge brightness curve trend of the display device, and improving the uniformity of the image quality at the edge portion of the display device.

In addition, the backlight module provided by the above-mentioned design scheme provided by the embodiments of the present disclosure has a simple structure and is easy to manufacture, which is beneficial to manufacturing and selling as an actual product and facilitates mass production. At the same time, the light mixing distance of the backlight module can be designed to be consistent or basically the same as that of products of the same series, therefore, this design scheme has less impact on the overall height of the backlight module, thereby enabling iteration based on products of the same series. For example, some molds can be continued to be used for manufacturing to reduce manufacturing costs. This design scheme has innovative design significance for similar products in the market, which is conducive to solving the problem of the dark frame easily generated in the display screen of the display device and has a good market prospect.

Figure 16:
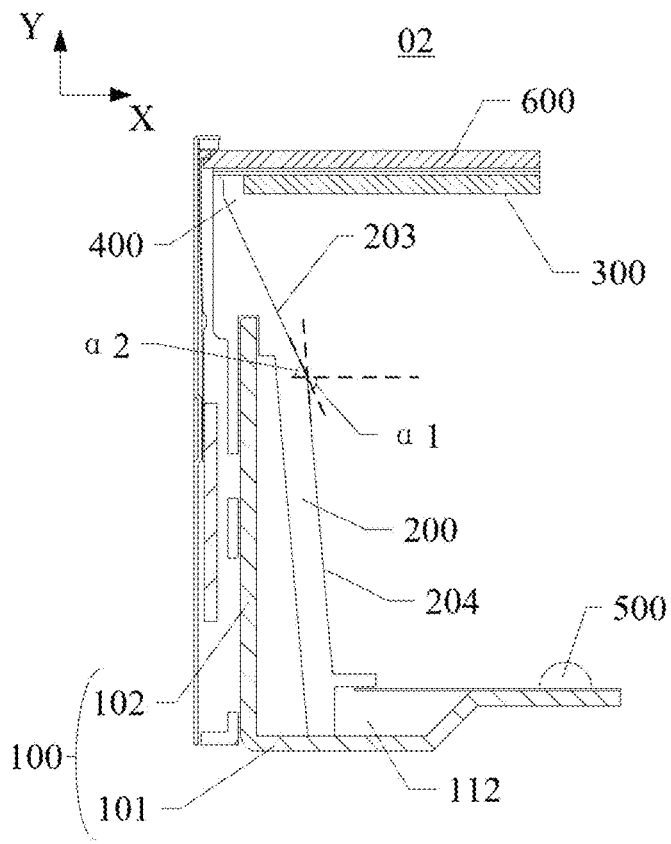
FIG. 16 is a schematic diagram of another display device provided by at least one embodiment of the present disclosure.
Figure 17:
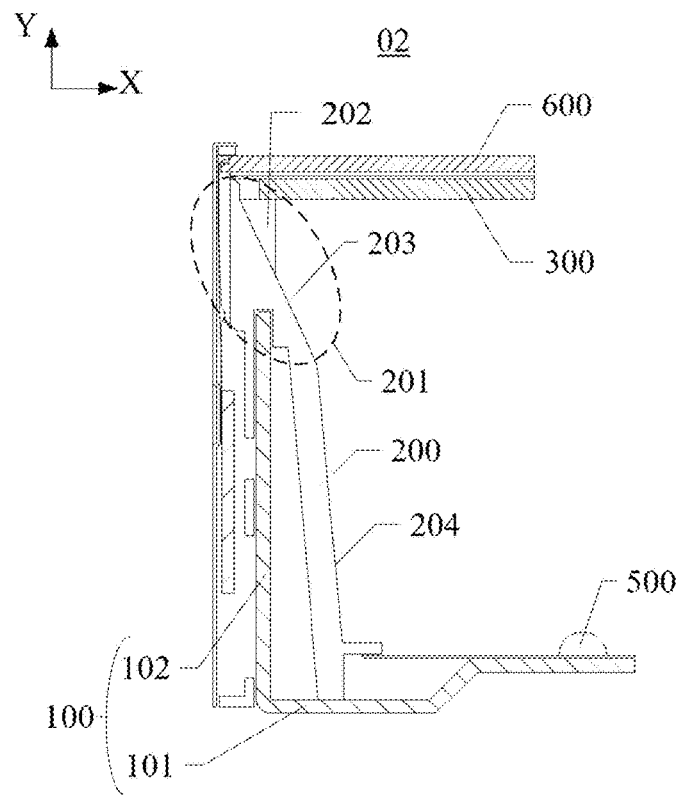
FIG. 17 is a schematic diagram of the display device in FIG. 16 at another angle.

FIG. 16 is a schematic diagram of another display device provided by at least one embodiment of the present disclosure; FIG. 17 is a schematic diagram of the display device in FIG. 16 at another angle.

For example, compared with the backlight module illustrated in FIG. 1, in the backlight module illustrated in FIG. 16 and FIG. 17, the structure of the middle frame 200 and the structure of the supporting portion 202 arranged at the side of the middle frame 200 close to the optical sheet 300 are different, and other structures can refer to the relevant descriptions of the above embodiments, which will not be repeated here.

For example, as illustrated in FIG. 16, the backlight module in a display device 02 includes a backplane 100, a middle frame 200 and an optical sheet 300. The backplane 100 includes a bottom wall 101 and a side wall 102, the side wall 102 is connected to the bottom wall 101 and is arranged at a periphery of the bottom wall 101, the bottom wall 101 and the side wall 102 form a receiving cavity 112. For example, the bottom wall 101 and the side wall 102 can be of an integral structure, and made of the same material, but are not limited thereto. The optical sheet 300 is located at a side of the middle frame 200 away from the bottom wall 101 and arranged opposite to the bottom wall 101.

For example, as illustrated in FIG. 16, the middle frame 200 is arranged around the circumference of the side wall 102, and the side wall 102 is configured to support the middle frame 200. The middle frame 200 of the backlight module includes a connecting portion 201 covering the side wall 102 and located at an end of the side wall 102 away from the bottom wall 101, so that the middle frame 200 can be stably connected with the backplane 100.

For example, as illustrated in FIG. 16 and FIG. 17, a surface of the connecting portion 201 facing the optical sheet 300 is provided with a plurality of supporting portions 202 configured to support the optical sheet 300. For example, the middle frame 200 laps the optical sheet 300 through the supporting portion 202 to provide supporting force for the optical sheet 300.

For example, as illustrated in FIG. 16 and FIG. 17, the plurality of supporting portions 202 are arranged at intervals on the surface of the connecting portion 201, and a gap is provided between the optical sheet 300 and a surface of a part of the middle frame 200 facing the optical sheet 300 and located between adjacent supporting portions 202. For example, the surface of the part of the middle frame 200 facing the optical sheet 300 and located between adjacent supporting portions 202 is spaced apart from the optical sheet 300. The backlight module further includes a light source 500 located on the bottom wall 101. For example, the light source 500 is configured to emit light and allow its light to reach the optical sheet 300. For example, the gap 400 is configured to transmit at least a part of the light emitted from the light source 500.

Therefore, as illustrated in FIG. 16 and FIG. 17, light can enter the gap 400, so that the part of the optical sheet 300 facing the gap 400 can be illuminated, the brightness of the edge portion of the optical sheet 300 can be significantly improved, the "dark region" generated caused by lapping of the supporting portion 202 and the optical sheet 300 can be reduced, and the overall brightness of the optical sheet 300 is uniform; at the same time, the brightness decay phenomenon that generates in the region of the display panel 600 close to the supporting portion 202 can be effectively alleviated, which is beneficial to improving the display effect of the display panel 600.

For example, as illustrated in FIG. 16 and FIG. 17, an angle $\alpha 1$ between the first side surface 203 and the first plane can be 60° to 65°, for example, the first plane is parallel to a surface of the optical sheet 300 facing the bottom wall 101. For example, the angle $\alpha 1$ between the first side surface 203 and the first plane can be relatively large to facilitate the light to enter the gap 400, thereby increasing the brightness of the edge portion of the optical sheet 300 and improving the display effect.

For example, as illustrated in FIG. 16 and FIG. 17, the angle $\alpha 1$ between the first side surface 203 and the first plane can be at least one of 61° to 65°, 62° to 64°, 63° to 65°, 62° to 63° and 63° to 64°, but is not limited thereto, which can be set according to design requirements.

For example, as illustrated in FIG. 16 and FIG. 17, the surface of the middle frame 200 away from the side wall 102 further includes a second side surface 204 that is connected with the first side surface 203, and the second side surface 204 is closer to the bottom wall 101 than the first side surface 203. For example, the angle $\alpha 2$ between the second side surface 204 and the first plane can be greater than the angle $\alpha 1$ between the first side surface 203 and the first plane, so as to reduce the light blocking by the second side surface 204 and facilitate the light to enter the gap 400.

For example, as illustrated in FIG. 16 and FIG. 17, the angle $\alpha 2$ between the second side surface 204 and the first plane can be 85° to 90°, for example, it can be at least one of 86° to 90°, 87° to 89°, or 88° to 90°, 85° to 87° and 86° to 89°, but is not limited thereto. With such an arrangement, the light can enter a space (that is, the gap 400) between the first side surface 203 and the optical sheet 300, which facilitates increasing the brightness of the edge portion of the optical sheet 300, thereby improving the display effect. For example, in the backlight module illustrated in FIG. 16, the angle $\alpha 2$ between the second side surface 204 and the first plane can be 90°, this design can make the end portion of the middle frame 200 away from the backlight module 300 be further away from the display region of the display panel 600 in the first direction X. For example, compared to a design scheme in which the angle $\alpha 2$ between the second side surface 204 and the first plane is 85°, in the case where the angle $\alpha 2$ between the second side surface 204 and the first plane is 90°, the distance between the end portion of the middle frame 200 away from the backlight module 300 and the side wall 102 in the first direction X can be reduced by 2 mm, so that the structural stability of the middle frame 200 can be improved, and the uniformity of the light effect of the edge portion of the display panel 600 can be improved.

For example, as illustrated in FIG. 16 and FIG. 17, the supporting portion 202 and the middle frame 200 may be separate structures, and the supporting portion 202 and the middle frame 200 may be made of different materials. For example, the supporting portion 202 can be fixed on the surface of the middle frame 200 facing the optical sheet 300 by bonding, bolt connecting and the like, which is not limited thereto, the embodiments of the present disclosure do not limit this. For example, the middle frame 200 may be made of white material, thereby having strong reflective properties. For example, the supporting portion 202 can be made of a transparent material to facilitate the transmission of light and allow the light to reach the edge portion of the optical sheet 300, which is beneficial to improving the brightness uniformity of the optical sheet 300. For example, the supporting portion 202 and the middle frame 200 may be manufactured by a two-color injection molding process to simplify the manufacturing process, which is not limited thereto.

For example, as illustrated in FIG. 16 and FIG. 17, for example, the materials of the supporting portion 202 and the middle frame 200 may both include polycarbonate (PC), but are not limited thereto. For example, the materials of the supporting portion 202 and the middle frame 200 may further include other materials. For example, the supporting portion 202 may be transparent to facilitate the transmission of light, but is not limited thereto. For example, the middle frame 200 may be white to have strong reflective performance, but is not limited thereto.

For example, as illustrated in FIG. 16 and FIG. 17, in the case where the angle $\alpha 1$ between the first side surface 203 and the first plane is large, the size of the supporting portion 202 in the normal direction of the first plane can be increased accordingly, so that the supporting portion 202 can be firmly disposed on the first side surface 203 and can provide sufficient supporting force for the optical sheet 300. For example, the size of the supporting portion 202 in the normal direction of the first plane may be 7 mm to 7.5 mm, such as at least one of 7.1 mm to 7.5 mm, 7.2 mm to 7.4 mm, 7.3 mm to 7.5 mm, and 7.4 mm to 7.5 mm, but is not limited thereto.

For example, as illustrated in FIG. 16 and FIG. 17, in the normal direction of the first plane, that is, in the second direction Y illustrated in FIG. 16, the minimum distance between the optical sheet 300 and the bottom wall 101 is 38 mm to 42 mm, for example, it can be at least one of 38 mm to 40 mm, 38 mm to 39 mm, 39 mm to 41 mm, and 41 mm to 42 mm, but is not limited thereto. For example, the minimum distance may be the light mixing distance of the backlight module. For example, with such an arrangement, the blocking of light by the middle frame 200 can be reduced, and the light can enter a space (that is, enter the gap 400) between the optical sheet 300 and the surface of the part of the middle frame 200 facing the optical sheet 300 and located between the adjacent supporting portions 202, thereby increasing the brightness of the edge portion of the optical sheet 300, improving the overall light mixing effect of the backlight module, and improving the uniformity of the display image of the display device.

Figure 18:
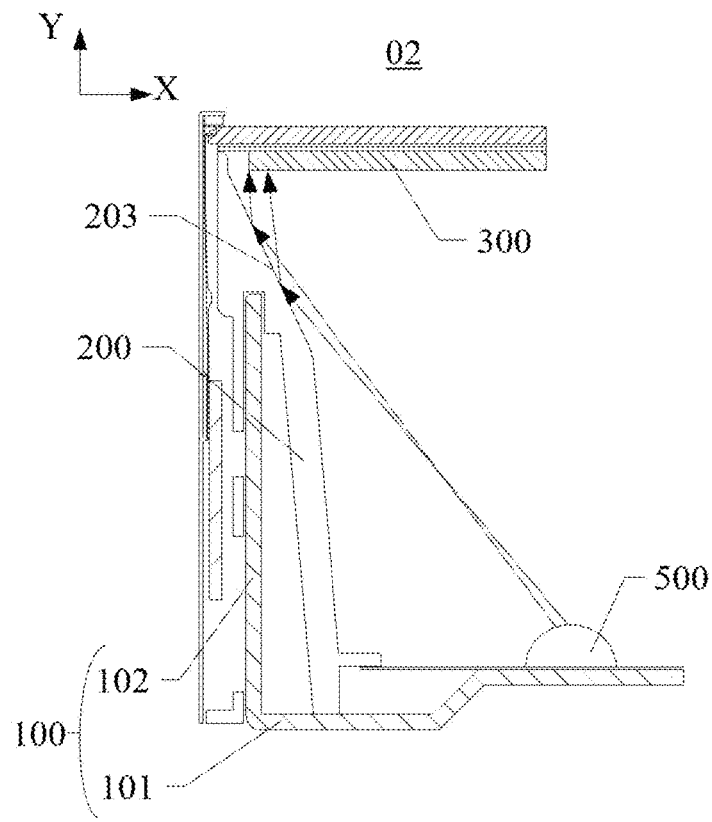
FIG. 18 is a schematic diagram of a light path of the backlight module in FIG. 16.
Figure 19:
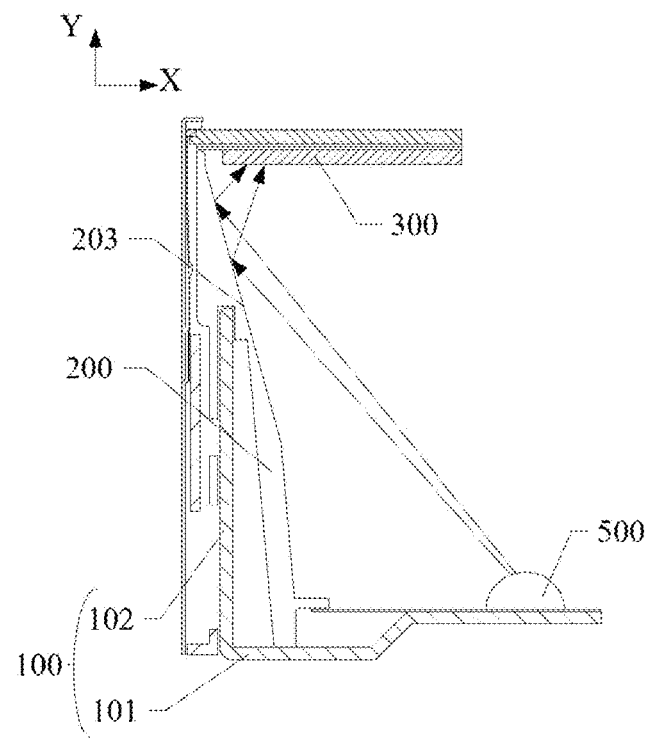
FIG. 19 is a schematic diagram of a light path of a backlight module.

FIG. 18 is a schematic diagram of a light path of the backlight module in FIG. 16. FIG. 19 is a schematic diagram of a light path of a backlight module.

For example, in the backlight module illustrated in FIG. 16 and FIG. 18, the angle α1 between the first side surface 203 and the first plane is 65°. In the backlight module illustrated in FIG. 19, the angle between the first side surface 203 and the first plane is greater than 70°, for example, 75°. According to FIG. 18 and FIG. 19, it can be seen that in the case where the angle α1 between the first side surface 203 and the first plane is greater than 70°, because the surface of the middle frame 200 is smooth, the light is difficult to be reflected to the edge of the optical sheet 300, which will cause that the edge portion of the optical sheet 300 has lower brightness. At the same time, as the angle α1 between the first side surface 203 and the first plane gradually increases, the distance between the optical sheet 300 and the bottom wall 101 in the normal direction of the first plane increases, so the distance between the optical sheet 300 and the light source 500 increases, resulting in a lower overall brightness of the display panel, which is not conducive to display. Therefore, considering the overall display effect of the display device, it is better to use the backlight module as illustrated in FIG. 18, that is, the scheme in which the angle α1 between the first side surface 203 and the first plane is 65°.

Figure 20:
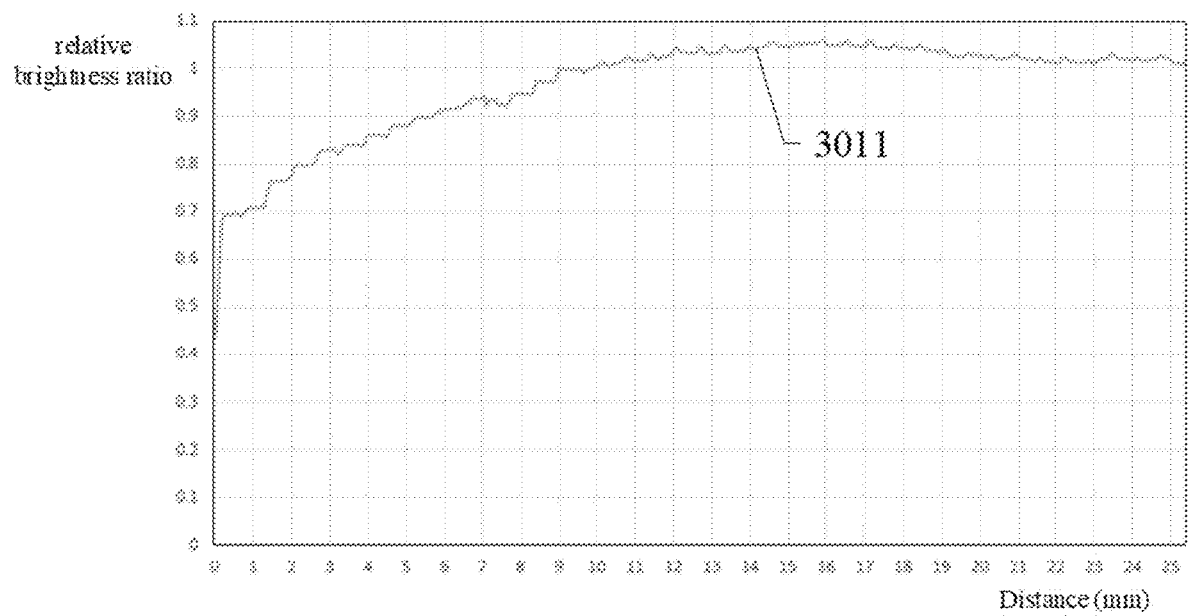
FIG. 20 is a schematic diagram of a brightness curve of the display device in FIG. 16.

FIG. 20 is a schematic diagram of a brightness curve of the display device in FIG. 16.

For example, as illustrated in FIG. 20, according to the brightness curve 3011 of the display device illustrated in FIG. 16, in the case where a distance from a position point in the display region of the display panel 600 to the edge of the display region is approximately 9.1 mm (that is, less than 10 mm), the brightness from this position point to the edge of the display region shows a decay trend. In the case where a distance from a position point in the display region of the display panel 600 to the edge of the display region is approximately 5 mm, the brightness of this position point decays to 90% of the brightness of the normal display region. In addition, in the case where the distance from a position point in the display region of the display panel 600 to the edge of the display region is about 7 to 8 mm, the brightness curve 3011 shows a slight downward fluctuation trend, this trend may be due to the transparent material used in the supporting portion 202, which has a refraction effect on the light. However, in the case where the distance from a position point in the display region of the display panel 600 to the edge of the display region is about 1 mm to 5 mm, because the supporting portion 202 made of transparent material has a good effect on improving the light efficiency, the downward fluctuation trend of the above-mentioned brightness curve 3011 is not obvious, and when visually observing the display screen of the display panel, basically no display defects and other phenomena can be found. In summary, the scheme illustrated in FIG. 16 can effectively improve the brightness of the edge region of the display panel, and can alleviate the "dark frame" caused by the lapping of the optical sheet 300 and the supporting portion 202, thereby improving the uniformity of the display quality of the display panel 600.

Figure 21:
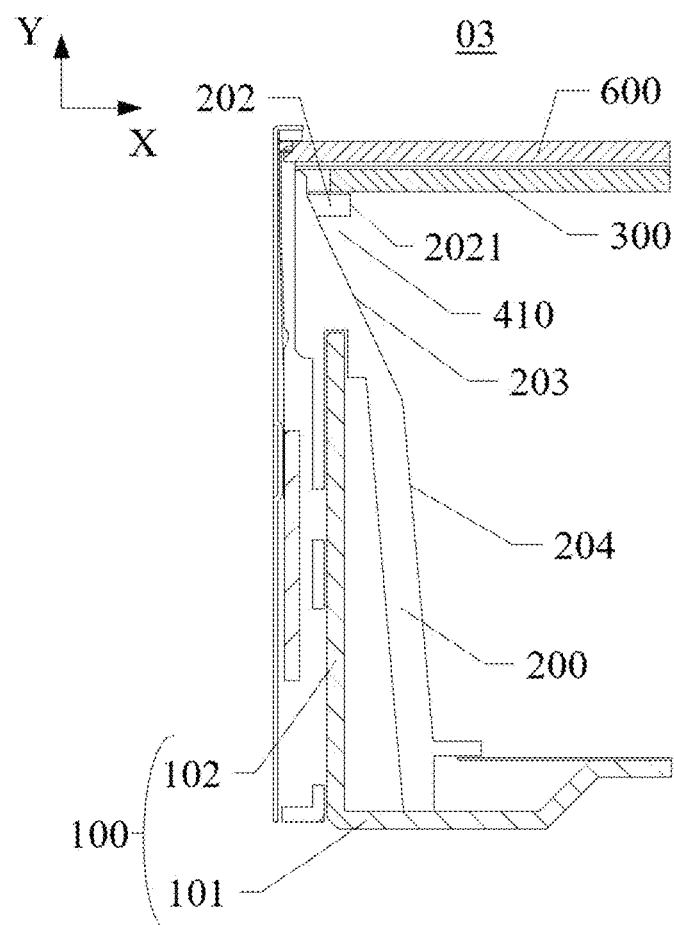
FIG. 21 is a schematic diagram of another display device provided by at least one embodiment of the present disclosure.

FIG. 21 is a schematic diagram of another display device provided by at least one embodiment of the present disclosure.

For example, as illustrated in FIG. 17 and FIG. 21, at least one embodiment of the present disclosure further provides a backlight module, and the difference between this backlight module and the backlight module in the display device 02 is in that the structure of the supporting portion 202 is different, other structures can refer to the relevant descriptions in the above embodiments and will not be repeated here.

For example, as illustrated in FIG. 21, in the display device 03, a cross section of the supporting portion 202 taken by the third plane is quadrangular, but is not limited thereto. For example, the cross section of the supporting portion 202 taken by the third plane may be trapezoidal, for example, right-angled trapezoidal, but is not limited thereto. For example, an interval 410 is provided between the first side surface 203 and an end surface 2021 of the supporting portion 202 close to the center of the optical sheet 300. With such an arrangement, a contact area between the supporting portion 202 and the first side surface 203 can be reduced, thereby reducing the weight of the supporting portion 202, which is beneficial to reducing design cost. For example, the third plane is perpendicular to the first plane, and the third plane is perpendicular to the arrangement direction of multiple supporting portions 202.

For example, as illustrated in FIG. 21, the size of the supporting portion 202 in the normal direction of the first plane is small to reduce the weight of the supporting portion 202. In addition, the supporting portion 202 and the middle frame 200 are of an integrated structure, which can simplify the manufacturing process and is beneficial to reducing manufacturing cost. For example, the size of the supporting portion 202 in the normal direction of the first plane (that is, in the second direction Y illustrated in FIG. 21) can be 1.5 mm to 2 mm, for example, it can be at least one of 1.5 mm to 1.8 mm, 1.6 mm to 1.9 mm, 1.7 mm to 1.8 mm and 1.6 mm to 1.7 mm, which can be specifically set according to design requirements, and the embodiments of the present disclosure do not limit this. For example, compared to the display device 01 illustrated in FIG. 3, in the case where a distance from a position point in the display region of the display device 03 including the display panel and the backlight module to the edge of the display region is about 0 to 5 mm, the brightness of the display panel is low; in the case where a distance from a position point in the display region to the edge of the display region is about 5 mm to 10 mm, the brightness of the display panel is basically the same.

At least one embodiment of the present disclosure further provides a display device, which may include the backlight module described in any of the above embodiments and a display panel (for example, the display panel 600 as illustrated in FIG. 3). The display panel is located at a side of the backlight module away from the bottom wall 101, and the backlight module is configured to provide backlight to the display panel. For example, the display panel may include an upper polarizer, a lower polarizer, a thin film transistor (TFT), a color filter (CF), and other structures arranged in a stack. Because the display device includes the backlight module of any of the above embodiments, it has the technical effects brought by the above backlight module, which will not be described again here.

For example, the display device may be a television, a laptop, a tablet, a wearable display device, a mobile phone, a vehicle-mounted display, a navigation, an e-book, a digital photo frame, an advertising light box, or any other products or components with a display function, the embodiments of the present disclosure do not limit this.

The following statements should be noted.

(1) The accompanying drawings involve only the structure(s) in connection with the embodiment(s) of the present disclosure, and other structure(s) can be referred to common design(s).

(2) In case of no conflict, features(s) in the same embodiments and in different embodiments may be combined with each other.

The above are merely specific implementations of the present disclosure without limiting the protection scope of the present disclosure thereto. The protection scope of the present disclosure should be based on the protection scope of the appended claims.

What is claimed is:

1. A backlight module, comprising:
a backplane, comprising a bottom wall and a side wall, wherein the side wall is connected with the bottom wall and arranged at a periphery of the bottom wall, and the bottom wall and the side wall form a receiving cavity;
a middle frame, arranged around a circumference of the side wall, wherein the side wall is configured to support the middle frame; and
an optical sheet, located at a side of the middle frame away from the bottom wall and arranged opposite to the bottom wall,
wherein the middle frame comprises a connecting portion covering the side wall and located outside the side wall, and the connecting portion is located at an end of the side wall away from the bottom wall, a surface of the connecting portion facing the optical sheet is provided with a plurality of supporting portions configured to support the optical sheet, and the plurality of supporting portions are arranged at intervals, a gap is provided between the optical sheet and a surface of a part of the middle frame facing the optical sheet and located between adjacent supporting portions of the plurality of supporting portions,
wherein the plurality of supporting portions are arranged at intervals along an edge of the middle frame, a minimum distance between two adjacent supporting portions is greater than a size of each of the plurality of supporting portions in an arrangement direction of the plurality of supporting portions.

2. The backlight module according to claim 1, wherein in the arrangement direction of the plurality of the supporting portions, the minimum distance between the two adjacent supporting portions is 40 to 60 times the size of the supporting portion.

3. The backlight module according to claim 1, wherein in the arrangement direction of the plurality of the supporting portions, the minimum distance between the two adjacent supporting portions is 45 mm to 50 mm, and/or
wherein in the arrangement direction of the plurality of the supporting portions, the size of the supporting portion is 1 mm to 1.5 mm.

4. The backlight module according to claim 1, further comprises a light source, wherein the light source is located on the bottom wall, and the gap is configured to transmit at least part of light emitted from the light source,
a surface of the connecting portion away from the side wall comprises a first side surface, the gap is located between the first side surface and the optical sheet, an angle between the first side surface and a first plane is 20° to 29°, and the first plane is parallel to a surface of the optical sheet facing the bottom wall.

5. The backlight module according to claim 4, wherein a surface of the middle frame facing the optical sheet comprises a first portion and a second portion that are connected with each other, the plurality of supporting portions are arranged on the first portion, and the gap is located between the second portion and the optical sheet.

6. The backlight module according to claim 4, wherein a minimum distance between a surface of the connecting portion facing the side wall and the first side surface is 8 mm to 9 mm.

7. The backlight module according to claim 6, wherein the surface of the connecting portion away from the side wall further comprises a second side surface and a third side surface, the first side surface is connected with the second side surface, the second side surface is connected with the third side surface, the third side surface is closer to the bottom wall than the first side surface, and an angle between the second side surface and the first plane is 60° to 65°,
herein in a normal direction of the first plane, a minimum distance between the optical sheet and the bottom wall is 28 mm to 35 mm.

8. The backlight module according to claim 6, wherein a surface of each of the plurality of supporting portions facing the optical sheet is parallel to the first plane, and a cross section of the supporting portion taken by the second plane is triangular, and the second plane is perpendicular to the first plane and perpendicular to an arrangement direction of the plurality of the supporting portions.

9. The backlight module according to claim 1, wherein each of the plurality of supporting portions and the middle frame are of an integrated structure and are made of a same material,
wherein an orthographic projection of the middle frame on the first plane is in a shape of a rectangular ring.

10. The backlight module according to claim 4, wherein an orthographic projection of the middle frame on the first plane is in a shape of a rectangular ring,
wherein
a count of supporting portions among the plurality of supporting portions in a length direction of the rectangular ring is 20 to 30;
a count of supporting portions among the plurality of supporting portions in a width direction of the rectangular ring is 12 to 18.

11. The backlight module according to claim 1, wherein a surface of the connecting portion away from the side wall comprises a first side surface, an angle between the first side surface and a first plane is 60° to 65°, and the first plane is parallel to a surface of the optical sheet facing the bottom wall.

12. The backlight module according to claim 11, wherein a surface of the middle frame away from the side wall further comprises a second side surface, the first side surface is connected with the second side surface, the second side surface is closer to the bottom wall than the first side surface, an angle between the second side surface and the first plane is 85° to 90°, and/or
wherein a size of each of the plurality of supporting portions in a normal direction of the first plane is 7 mm to 7.5 mm.

13. The backlight module according to claim 1, wherein each of the plurality of supporting portions and the middle frame are of separate structures and are made of different materials, wherein the supporting portion comprises a transparent material.

14. The backlight module according to claim 1, wherein in a normal direction of a first plane, a minimum distance between the optical sheet and the bottom wall is 38 mm to 42 mm, and the first plane is parallel to a surface of the optical sheet facing the bottom wall.

15. The backlight module according to claim 12, wherein a cross section of each of the plurality of supporting portions taken by a third plane is quadrilateral, and an interval is provided between the first side surface and an end surface of the supporting portion close to a center of the optical sheet, the third plane is perpendicular to the first plane, and the third plane is perpendicular to an arrangement direction of the plurality of the supporting portions.

16. A display device, comprising:
the backlight module according to claim 1; and
a display panel, located at a side of the backlight module away from the bottom wall, wherein the backlight module is configured to provide backlight to the display panel.

17. A backlight module, comprising:
a backplane, comprising a bottom wall and a side wall, wherein the side wall is connected with the bottom wall and arranged at a periphery of the bottom wall, and the bottom wall and the side wall form a receiving cavity;
a middle frame, arranged around a circumference of the side wall, wherein the side wall is configured to support the middle frame; and
an optical sheet, located at a side of the middle frame away from the bottom wall and arranged opposite to the bottom wall,
wherein the middle frame comprises a connecting portion covering the side wall and located outside the side wall, and the connecting portion is located at an end of the side wall away from the bottom wall, a surface of the connecting portion facing the optical sheet is provided with a plurality of supporting portions configured to support the optical sheet, and the plurality of supporting portions are arranged at intervals, a gap is provided between the optical sheet and a surface of a part of the middle frame facing the optical sheet and located between adjacent supporting portions of the plurality of supporting portions,
wherein the backlight module further comprises a light source, wherein the light source is located on the bottom wall, and the gap is configured to transmit at least part of light emitted from the light source,
a surface of the connecting portion away from the side wall comprises a first side surface, the gap is located between the first side surface and the optical sheet, an angle between the first side surface and a first plane is 20° to 29°, and the first plane is parallel to a surface of the optical sheet facing the bottom wall.

18. The backlight module according to claim 17, wherein a surface of the connecting portion away from the side wall comprises a first side surface, an angle between the first side surface and a first plane is 60° to 65°, and the first plane is parallel to a surface of the optical sheet facing the bottom wall.

19. A backlight module, comprising:
a backplane, comprising a bottom wall and a side wall, wherein the side wall is connected with the bottom wall and arranged at a periphery of the bottom wall, and the bottom wall and the side wall form a receiving cavity;
a middle frame, arranged around a circumference of the side wall, wherein the side wall is configured to support the middle frame; and
an optical sheet, located at a side of the middle frame away from the bottom wall and arranged opposite to the bottom wall,
wherein the middle frame comprises a connecting portion covering the side wall and located outside the side wall, and the connecting portion is located at an end of the side wall away from the bottom wall, a surface of the connecting portion facing the optical sheet is provided with a supporting portion configured to support the optical sheet,
wherein a surface of the connecting portion away from the side wall comprises a first side surface, an angle between the first side surface and a first plane is 60° to 65°, and the first plane is parallel to a surface of the optical sheet facing the bottom wall.

20. The backlight module according to claim 19, wherein a plurality of supporting portions are provided, and the plurality of supporting portions are arranged at intervals, a gap is provided between the optical sheet and a surface of a part of the middle frame facing the optical sheet and located between adjacent supporting portions of the plurality of supporting portions.

* * * * *